(12) United States Patent
Daniel

(10) Patent No.: US 8,539,691 B2
(45) Date of Patent: Sep. 24, 2013

(54) HANGING DEVICE

(76) Inventor: Roberto R. Daniel, Zion, IL (US)

( * ) Notice: Subject to any disclaimer, the term of this patent is extended or adjusted under 35 U.S.C. 154(b) by 0 days.

(21) Appl. No.: 13/187,748

(22) Filed: Jul. 21, 2011

(65) Prior Publication Data

US 2012/0246957 A1 Oct. 4, 2012

Related U.S. Application Data

(60) Provisional application No. 61/366,854, filed on Jul. 22, 2010.

(51) Int. Cl.
*G01B 5/25* (2006.01)

(52) U.S. Cl.
USPC .............................. 33/645; 33/613

(58) Field of Classification Search
USPC ..................................... 33/613, 645
See application file for complete search history.

(56) References Cited

U.S. PATENT DOCUMENTS

| | | | |
|---|---|---|---|
| 3,116,563 A * | 1/1964 | Gelbman ......................... | 33/645 |
| 3,628,253 A | 12/1971 | Shepard | |
| 4,220,309 A | 9/1980 | Eisen et al. | |
| 4,241,510 A | 12/1980 | Radecki | |
| 4,443,949 A | 4/1984 | Newton | |
| 4,637,583 A | 1/1987 | Babitz | |
| 5,103,573 A | 4/1992 | Ehling et al. | |
| 5,103,574 A | 4/1992 | Levy | |
| 5,131,164 A | 7/1992 | Miller | |
| 5,167,075 A * | 12/1992 | Weldy et al. .................... | 33/343 |
| 5,451,027 A | 9/1995 | McHenry | |
| 5,509,213 A | 4/1996 | Kelly et al. | |
| 5,749,558 A * | 5/1998 | Wallo .......................... | 248/475.1 |
| 5,794,903 A | 8/1998 | Peterson, II | |
| 5,867,917 A * | 2/1999 | Karon ............................. | 33/613 |
| 5,881,468 A * | 3/1999 | Baumann ........................ | 33/383 |
| 5,927,675 A | 7/1999 | Kratish et al. | |
| 5,937,531 A * | 8/1999 | Menk et al. ..................... | 33/613 |
| 6,029,362 A | 2/2000 | Miodragovic | |
| 6,032,378 A | 3/2000 | Null | |
| 6,049,991 A | 4/2000 | Gruenberg et al. | |
| 6,286,803 B1 | 9/2001 | Pellino et al. | |
| 6,421,928 B1 * | 7/2002 | Miller .............................. | 33/520 |
| 6,473,983 B1 * | 11/2002 | Gier ................................ | 33/613 |
| 6,739,065 B2 | 5/2004 | Hofmeister et al. | |
| 6,785,977 B1 * | 9/2004 | Crichton ......................... | 33/613 |
| 6,898,862 B1 | 5/2005 | Oberst | |
| 6,971,184 B2 | 12/2005 | Prevost | |
| 7,155,840 B1 | 1/2007 | Carbonaro | |

(Continued)

*Primary Examiner* — Yaritza Guadalupe-McCall
(74) *Attorney, Agent, or Firm* — Erickson Law Group, PC

(57) ABSTRACT

An alignment device or jig that includes a level and a rule which is used for hanging wall supported items. The device includes locator blocks with locator pins for supporting the item and stud finder sensors for locating wall studs. The locator pins extend to protrude from the back side of the jig to allow a mark to be made into the hanging surface when the jig is pressed against the hanging surface. In the event that the item requires a stronger surface to hang onto due to excessive weight, a stud finder system can be utilized. In operation, one or more of picture frames to be mounted to a wall are hung on the device on one or more hangers. The hangers are slidingly spaced along the device scale for desired picture spacing. The device with the frames is placed against the wall and pressed to the wall, wherein the marking points mark the wall at the exact desired points where permanent hangers will be driven into the wall to support the one or more picture frames.

19 Claims, 25 Drawing Sheets

(56) References Cited

U.S. PATENT DOCUMENTS

| | | |
|---|---|---|
| 7,210,243 B2 * | 5/2007 | Schmidt et al. ............... 33/613 |
| 7,226,032 B2 | 6/2007 | Schlais et al. |
| 7,316,078 B2 * | 1/2008 | Hagman ........................ 33/613 |
| 7,509,752 B2 * | 3/2009 | Schmidt et al. ............... 33/613 |
| 8,061,054 B2 * | 11/2011 | Rabin ............................ 33/613 |
| 8,117,760 B1 * | 2/2012 | Revell ........................... 33/458 |
| 2002/0078583 A1 | 6/2002 | Richardson |
| 2002/0124426 A1 | 9/2002 | Dewberry |
| 2002/0189119 A1 * | 12/2002 | High .............................. 33/613 |
| 2004/0049936 A1 * | 3/2004 | Newman ....................... 33/613 |
| 2006/0101661 A1 * | 5/2006 | Schmidt et al. ............... 33/613 |
| 2006/0174504 A1 | 8/2006 | Szumer et al. |
| 2009/0165315 A1 * | 7/2009 | Rabin ............................ 33/485 |
| 2009/0188123 A1 | 7/2009 | Chou |
| 2010/0325905 A1 * | 12/2010 | Coyle ............................ 33/332 |
| 2012/0246957 A1 * | 10/2012 | Daniel .......................... 33/645 |

* cited by examiner

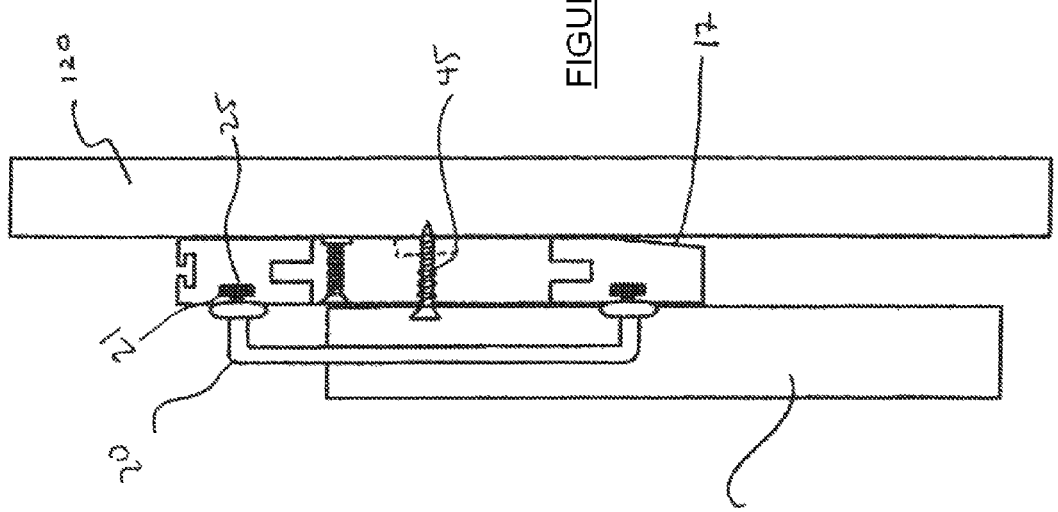
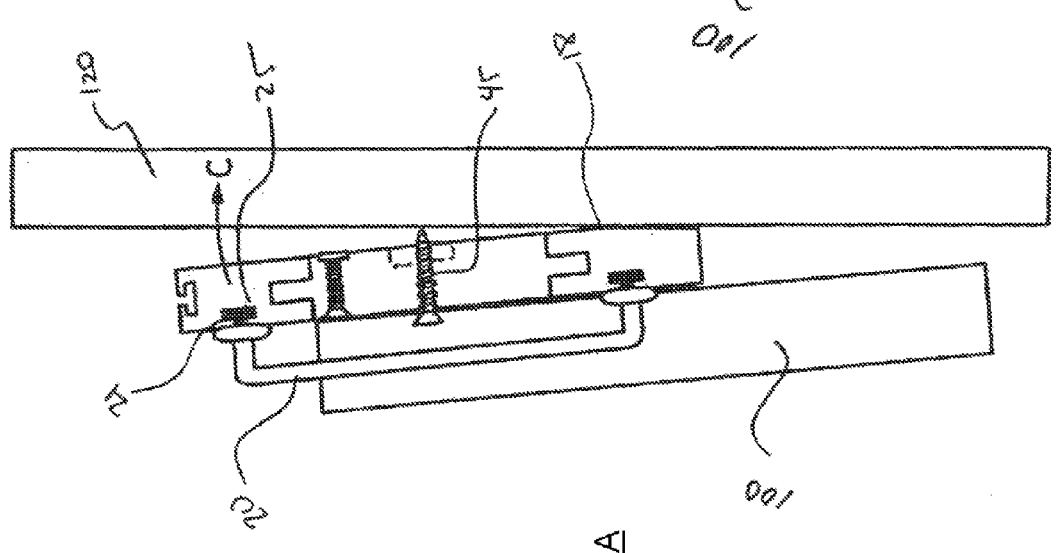
FIGURE 5A
FIGURE 5B

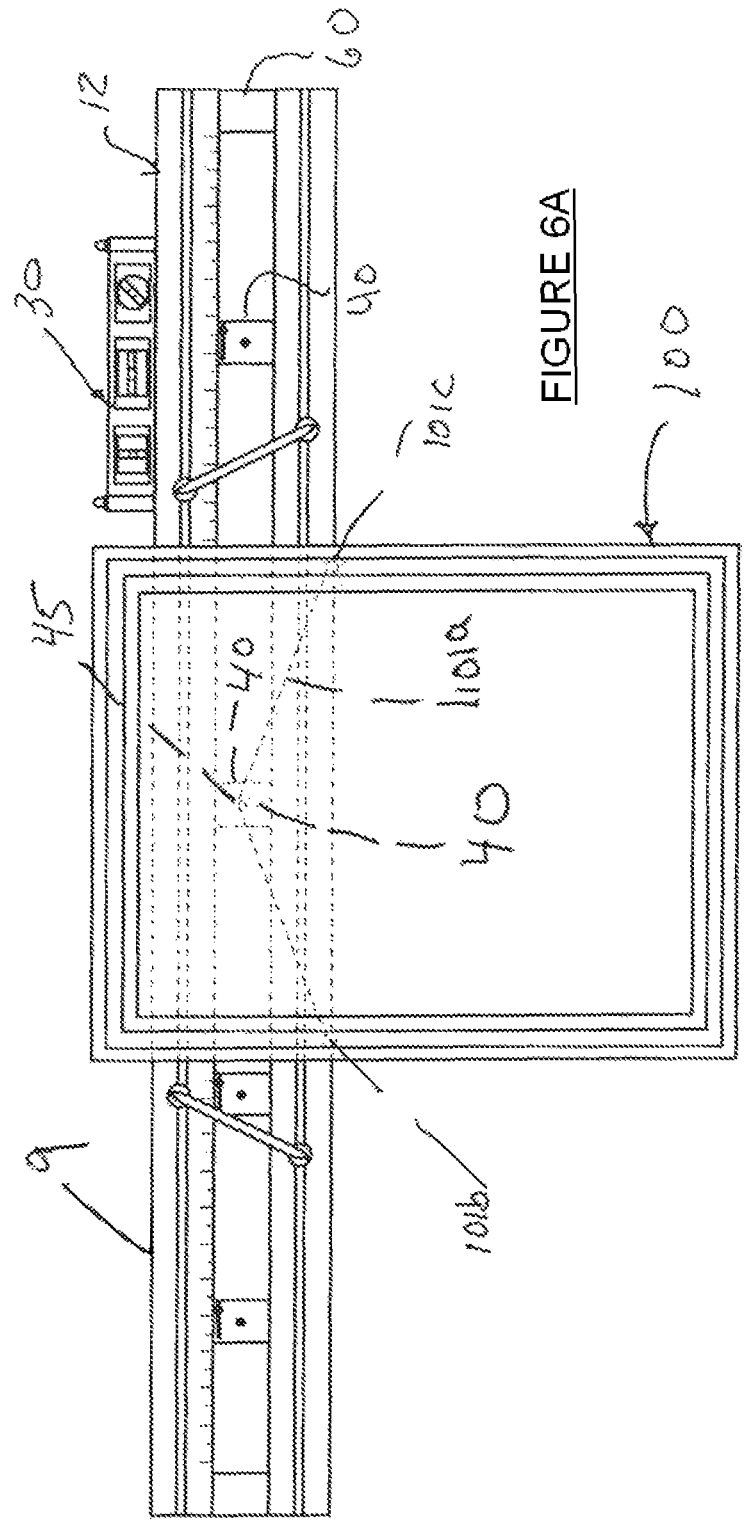

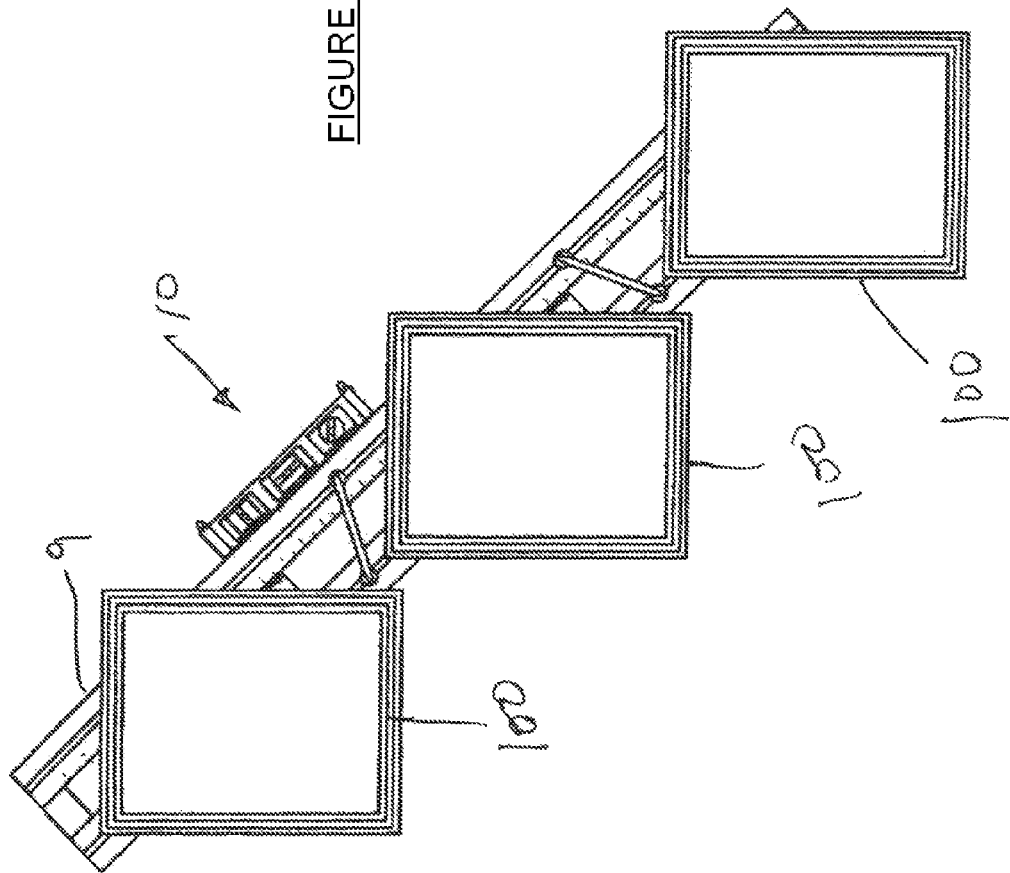

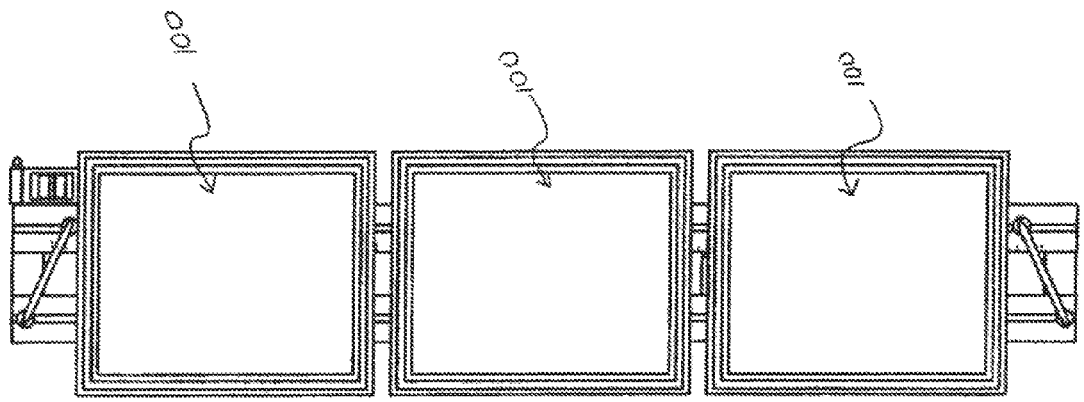

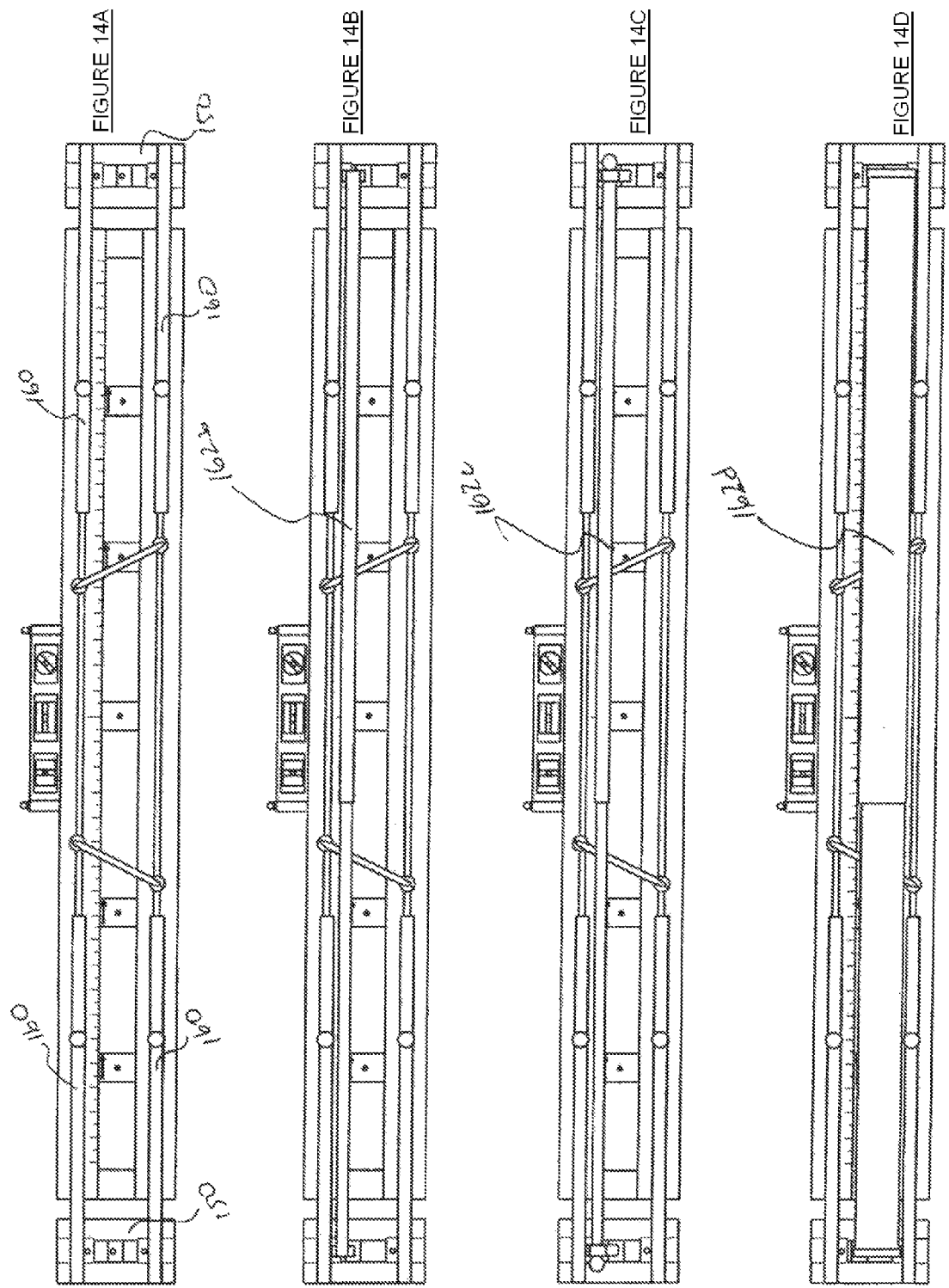

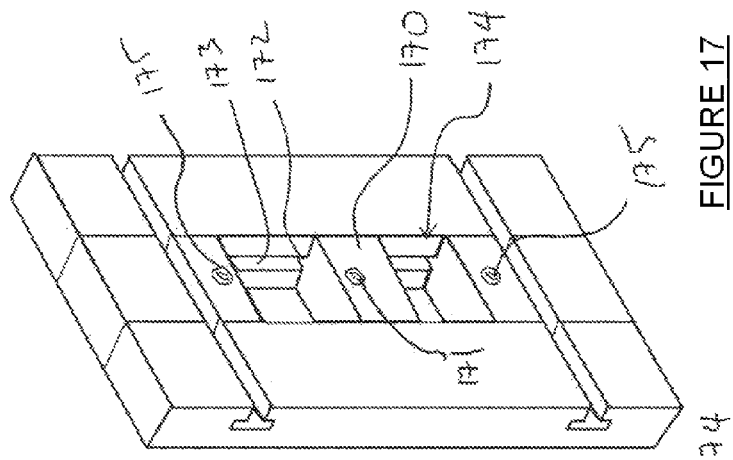
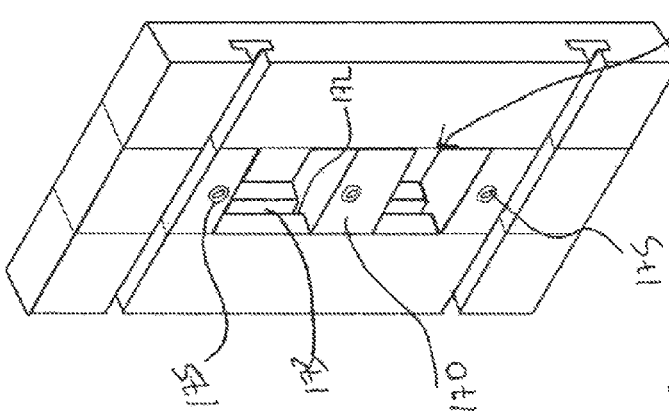
FIGURE 17
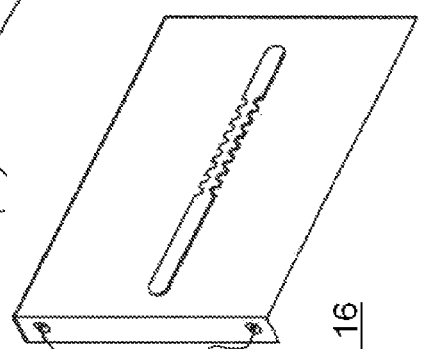
FIGURE 16
FIGURE 15
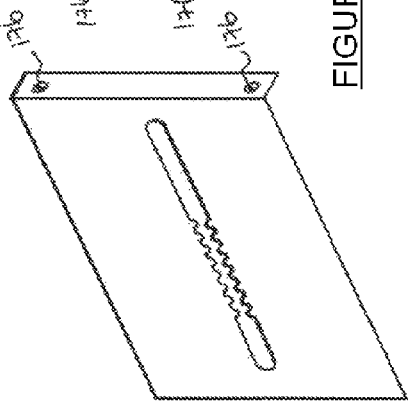

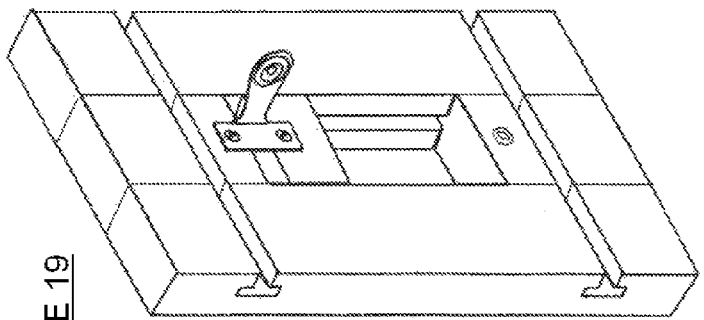
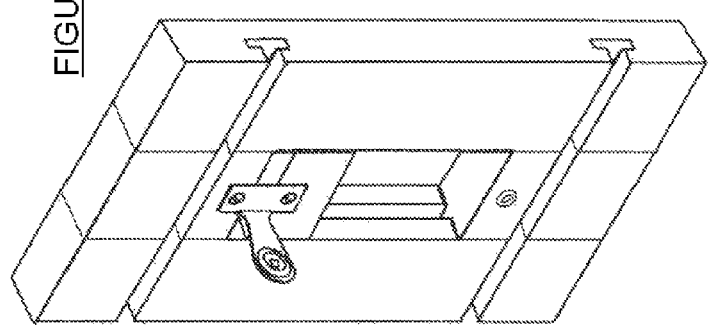
FIGURE 19
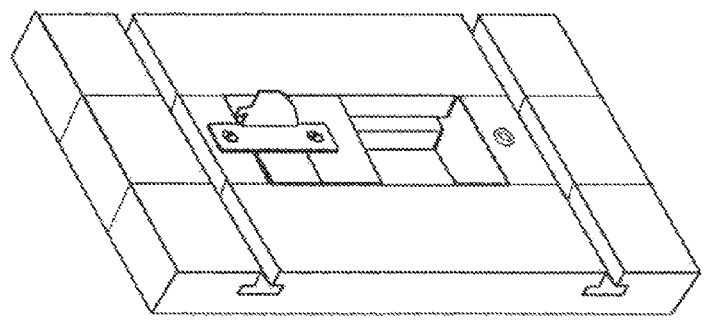
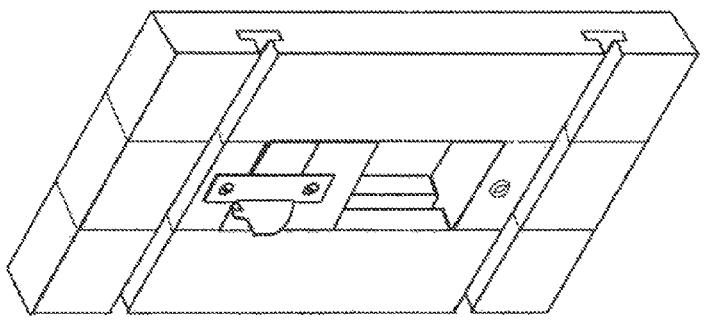
FIGURE 18

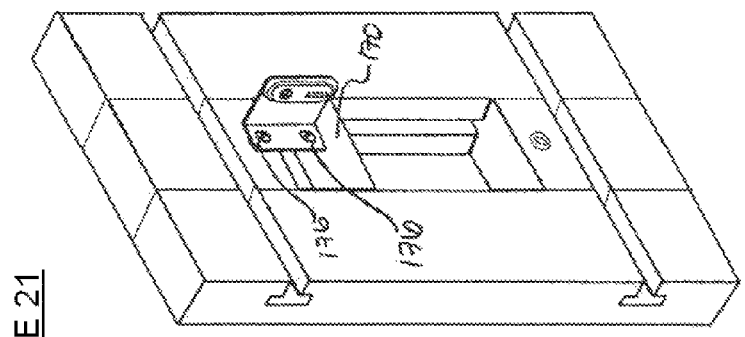
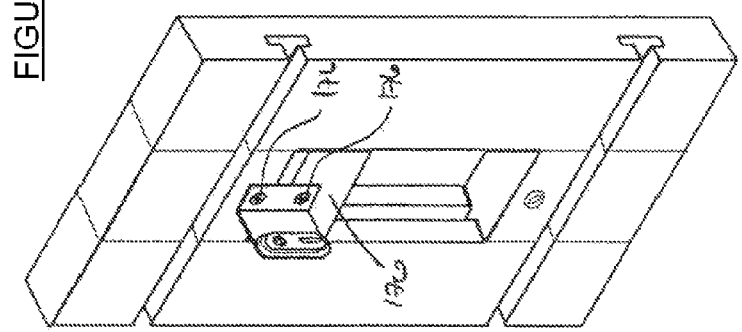
FIGURE 21
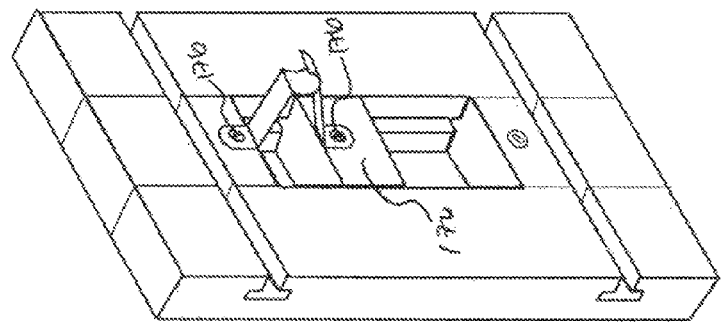
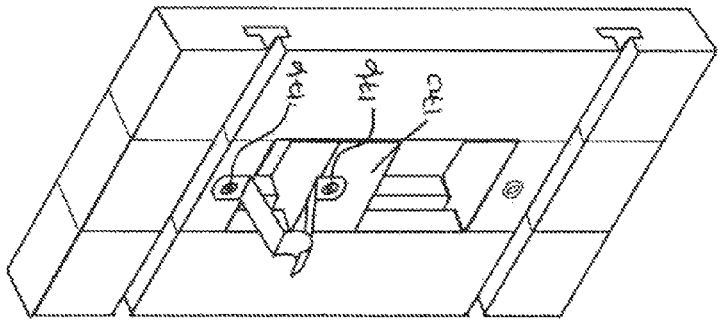
FIGURE 20

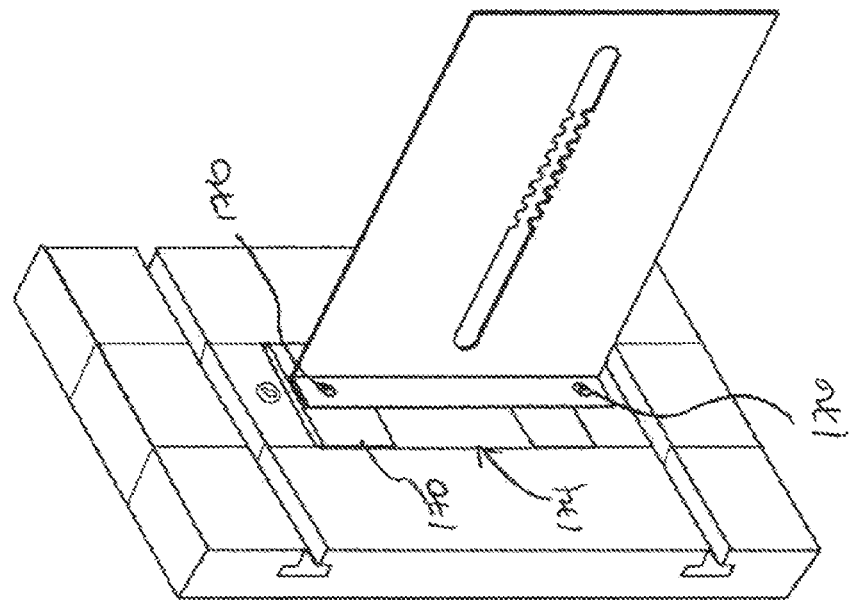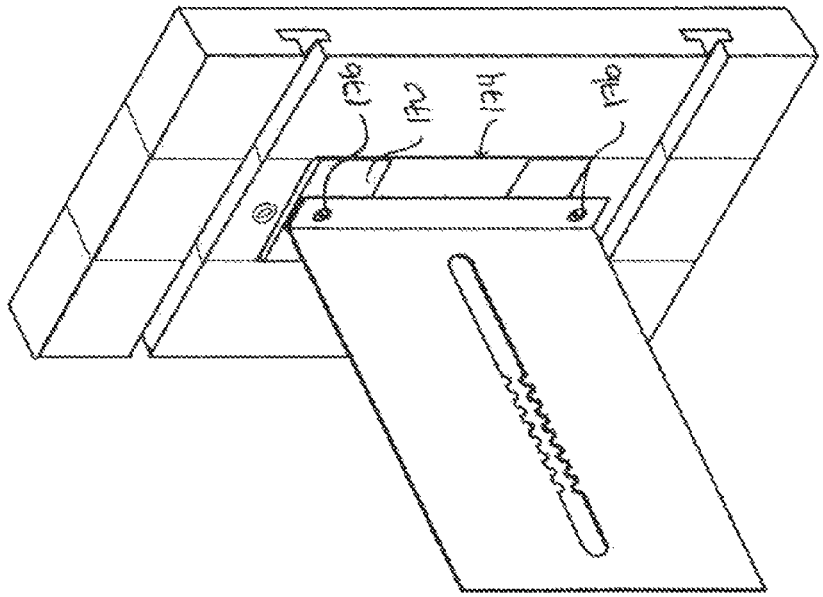
FIGURE 22

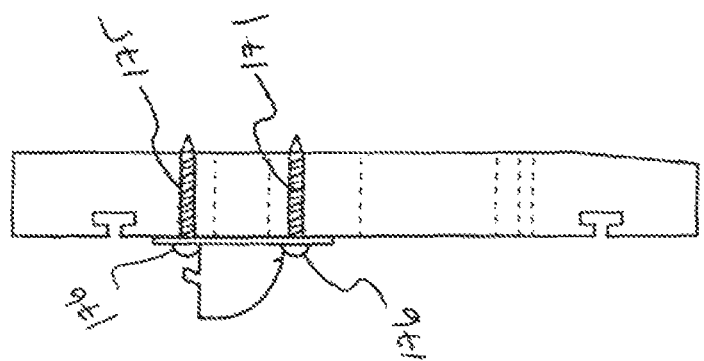
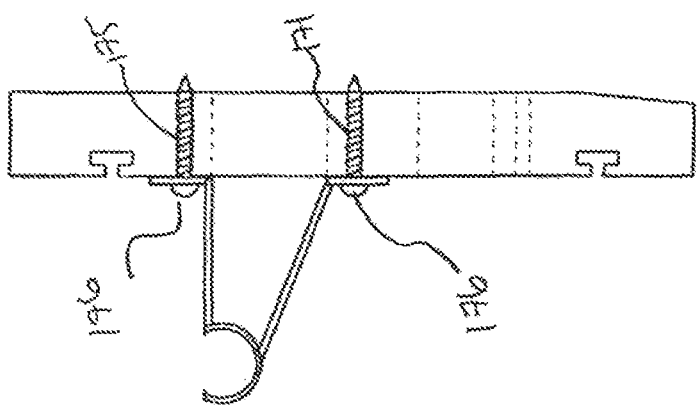

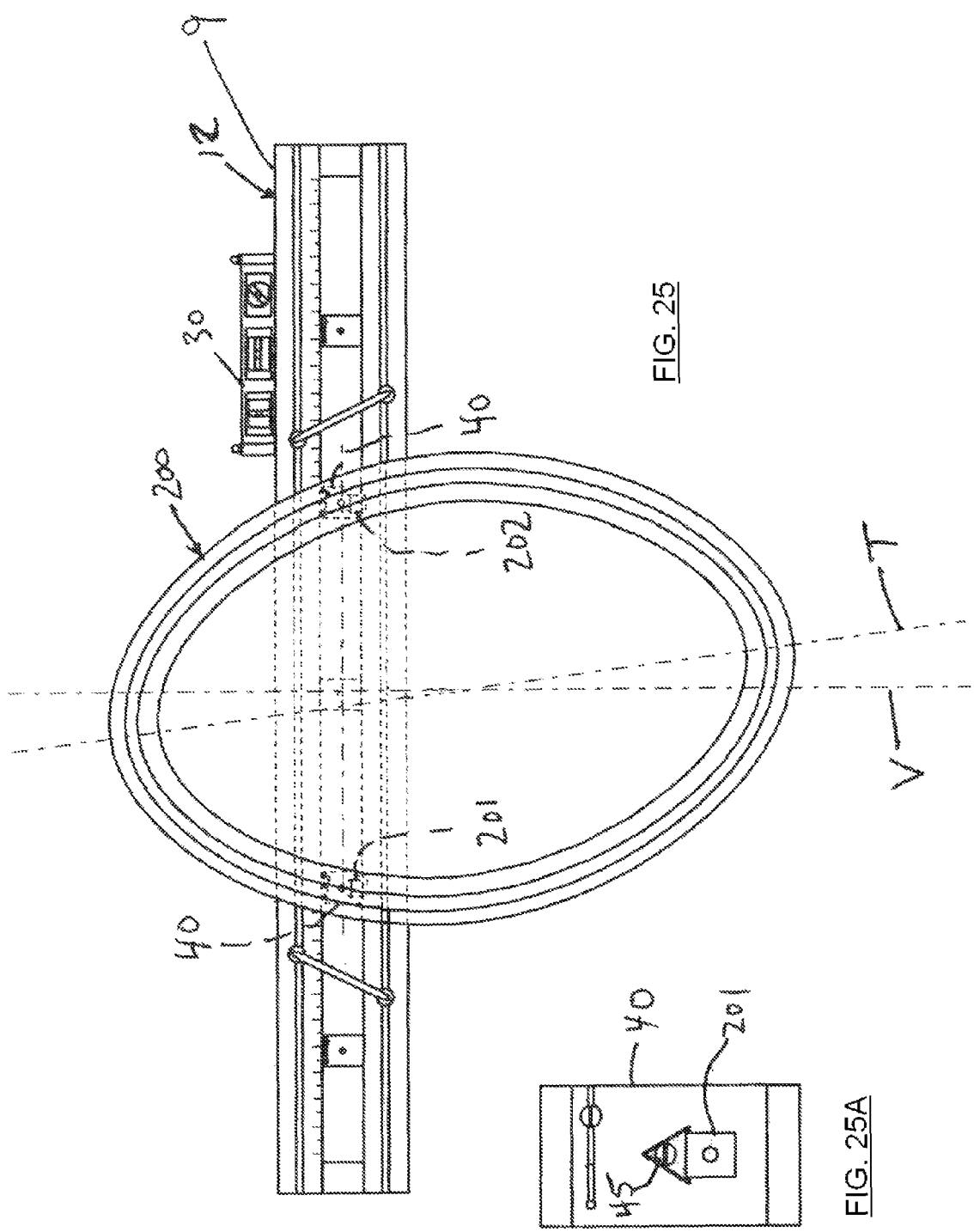

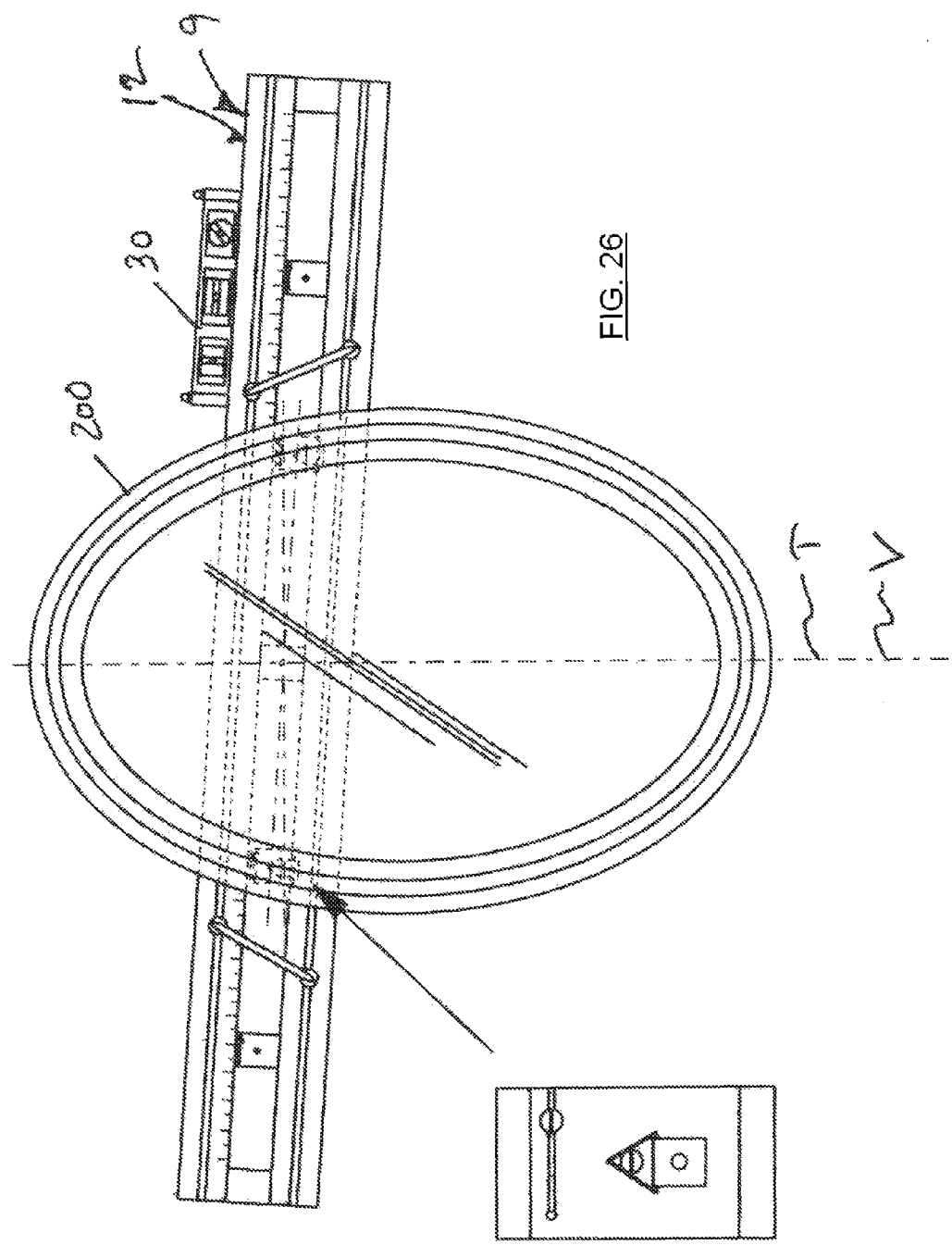

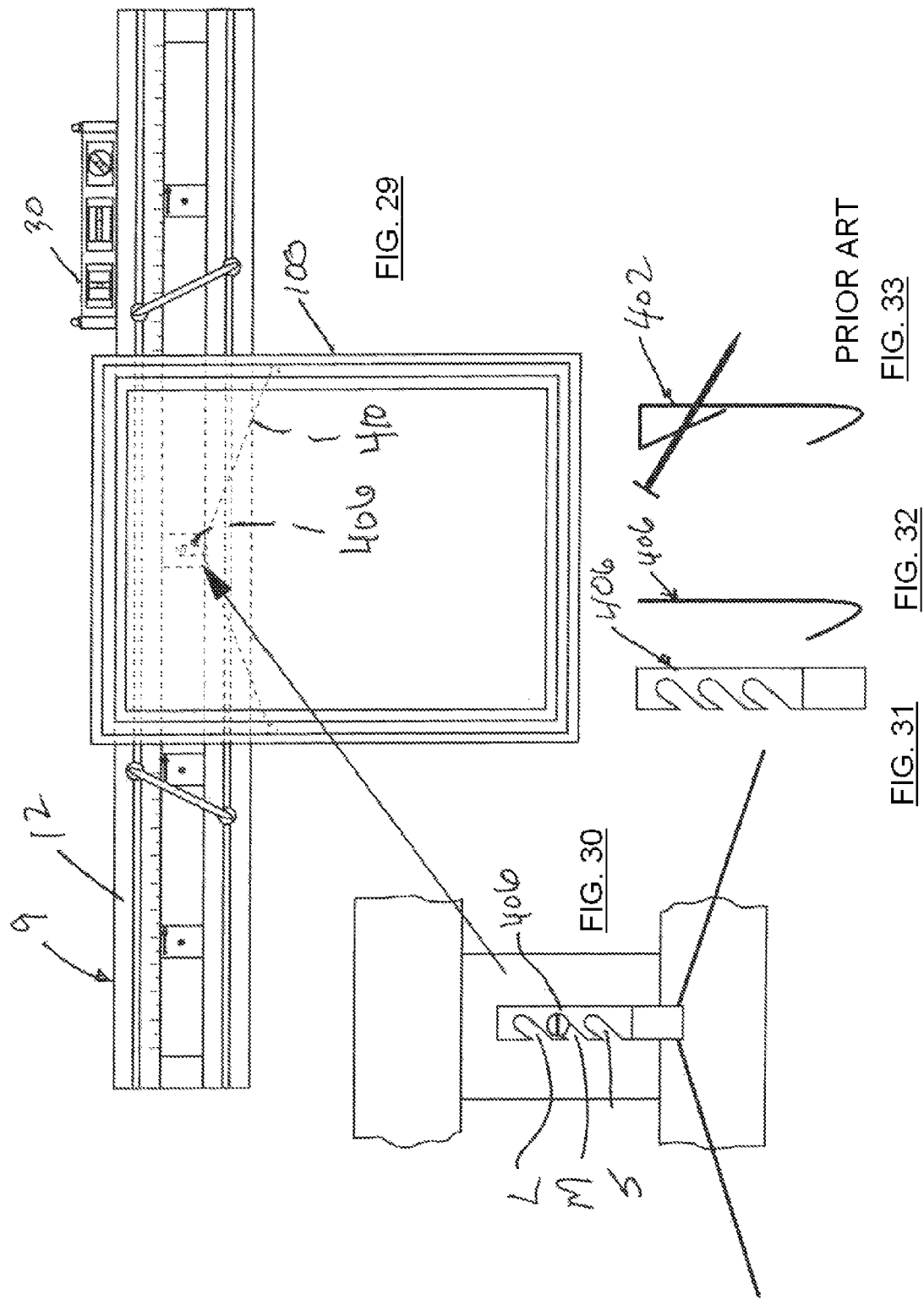

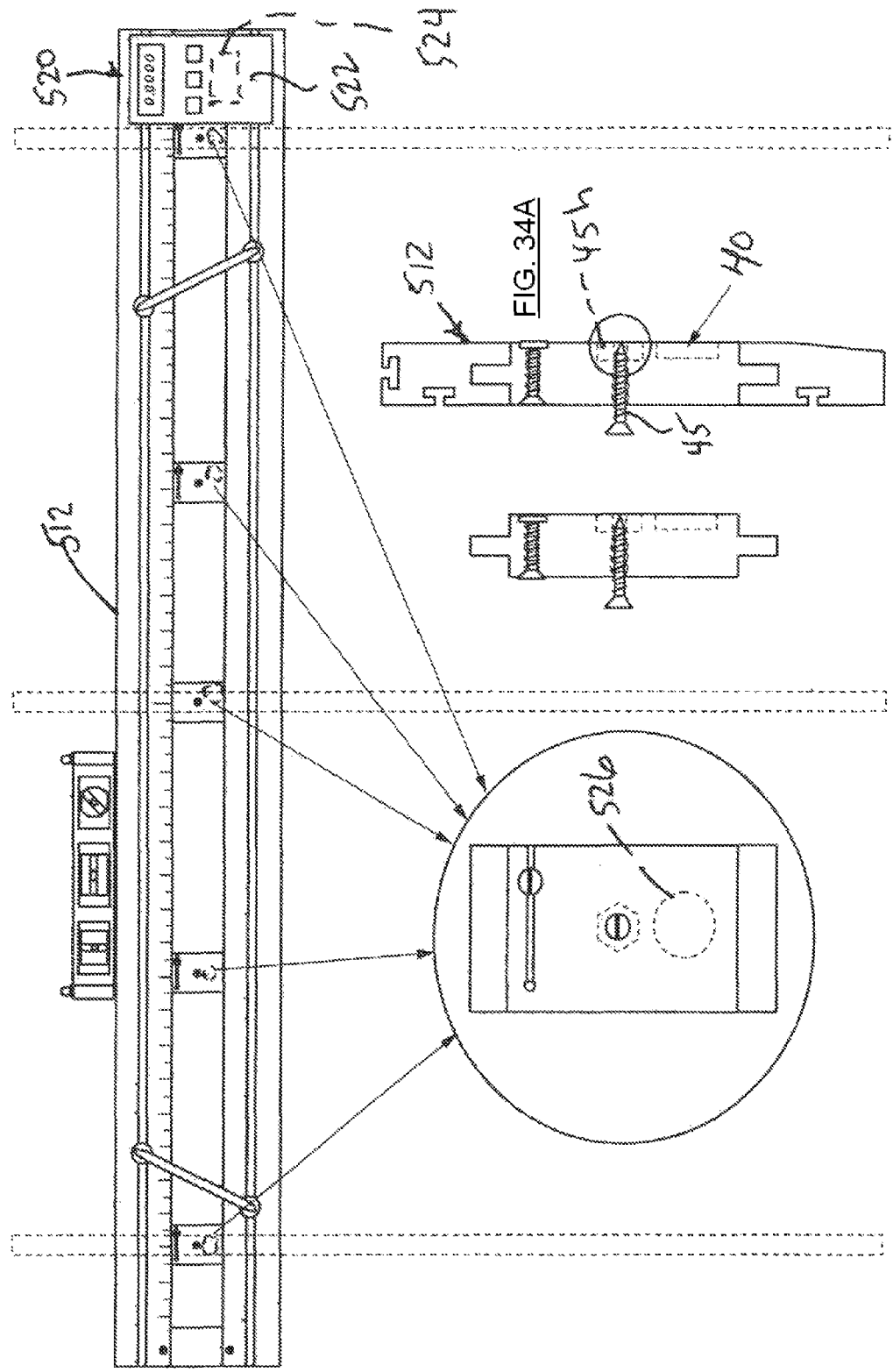

HANGING DEVICE

This application claims the benefit of U.S. Provisional Application Ser. No. 61/366,854 filed Jul. 22, 2010.

FIELD OF THE INVENTION

This invention relates in general to devices for use in hanging wall supported items.

BACKGROUND OF THE INVENTION

Attachment means such as nails, hooks, hangers and the like are generally used to hang wall supported items such as picture, mirrors, paintings, curtain rods, and other decorative items. Often, two or more attachment means are used to hang an item. To hang an item properly, it is necessary to ensure that attachment means are correctly aligned with respect to each other so the item will not be crooked. However, it is difficult to ensure that each attachment means is fixed to the wall at a proper location to ensure that the wall supported item will be hung evenly.

When hanging up more than one wall supported item next to each other, such as when hanging multiple pictures in position relative to each other, the task often becomes even more difficult, as more staging and aligning is required.

Usually, a location on the hanging surface where the item is desired to be placed is identified. Attachment means are then fixed to the wall to create the desired placement of item. When using more than one attachment means, the attachment means need to be level with each other to ensure that the item will be displayed evenly. This usually requires a person to use a level, or to measure distances from the ground or ceiling to where the attachment means is to be affixed to the hanging surface, which require the involvement of more than one person.

The present inventor has recognized the need for a device which is easy to use, and provides the user with the ability to preview staging of the items before the attachment means are affixed to the hanging surface.

The present inventor has recognized the need for a device which facilitates the hanging of items at desired locations on a hanging surface by providing markings to indicate where attachment mechanisms should be affixed to the hanging surface.

The present inventor has recognized the need for a device which can be adapted for use with various types of curtain rod hangers which span different distances to accommodate curtain rods of different lengths.

SUMMARY OF THE INVENTION

An alignment device or jig that can include a level, a rule, a stud finder, and slideable locator blocks is used for hanging wall supported items. The locator blocks are slideable along portions of the jig. The locator blocks comprise locator pins on first side of the device from which the item is hanged. The locator pins extend toward the wall from a second side of the device opposite the first side. The locater pins can be a marker, a simple nail, locking adjustable screws with a piercing point, or the like. These can be used alone or with a more complex hanger, such as a picture hanger. When pressed against the hanging surface, the locator pins make a mark, an indentation or hole on the hanging surface to indicate where an attachment mechanism for the wall supported item.

In operation, one or more of a wall mounted item such as picture frames to be mounted to a wall are hung onto the locator pins, which are affixed on moveable locator blocks. The locator blocks are slidingly spaced along the rule until the desired picture spacing is achieved. Locator blocks are then secured in place to prevent further movement from their selected location. The device with hanging items is placed against the wall and pressed to the wall, wherein the locator pins mark the wall at the exact desired points where permanent hangers will be driven into the wall to support the one or more picture frames. The device is moved away from the wall and permanent hanging means such as nails are installed at the marked locations on the wall.

The device can also incorporate a stud finder system that can be wireless and include a CPU and a multiplicity of sensors. The CPU can be directly mounted on the device or remotely as required by the user. The sensors can be incorporated within each sensor block.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 1A illustrates one type of hanger that can be used with the device.

FIGS. 5A to 5B illustrate the device marking the hanging surface.

FIGS. 6 to 9 illustrate some ways the device can be used to hang pictures, paintings, etc.

FIGS. 13 to 14D illustrate the device for use with various curtain rod types.

FIGS. 15 to 16 illustrate types of curtain rod hangers that can be used with the device.

FIG. 17 is a perspective view of the curtain rod end fixtures with slideable blocks to accommodate various types of hangers.

FIGS. 18 to 24 illustrates various curtain rod hangers engaging with the curtain rod end fixtures.

FIG. 25 is an elevation view of the apparatus in a first stage of hanging an oblong picture with misaligned devices.

FIG. 25A is an enlarged view of a portion of FIG. 25.

FIG. 26 is a view that illustrates the oblong picture in the proper orientation from FIG. 25 in a second stage.

FIG. 29 is an elevation view of the apparatus in a first stage of hanging a rectangular picture using an adapter for compensating the use of a picture hanging J-shaped hanger.

FIG. 30 is an enlarged view of a portion of FIG. 29.

FIG. 31 is an enlarged elevation view of a portion of FIG. 30.

FIG. 32 is a side view of the portion shown in FIG. 31.

FIG. 33 is a side view of a prior art J-shaped hanger for hanging pictures.

FIG. 34 is an elevation view of an alternate device.

DETAILED DESCRIPTION OF THE PREFERRED EMBODIMENTS

Figure 1:
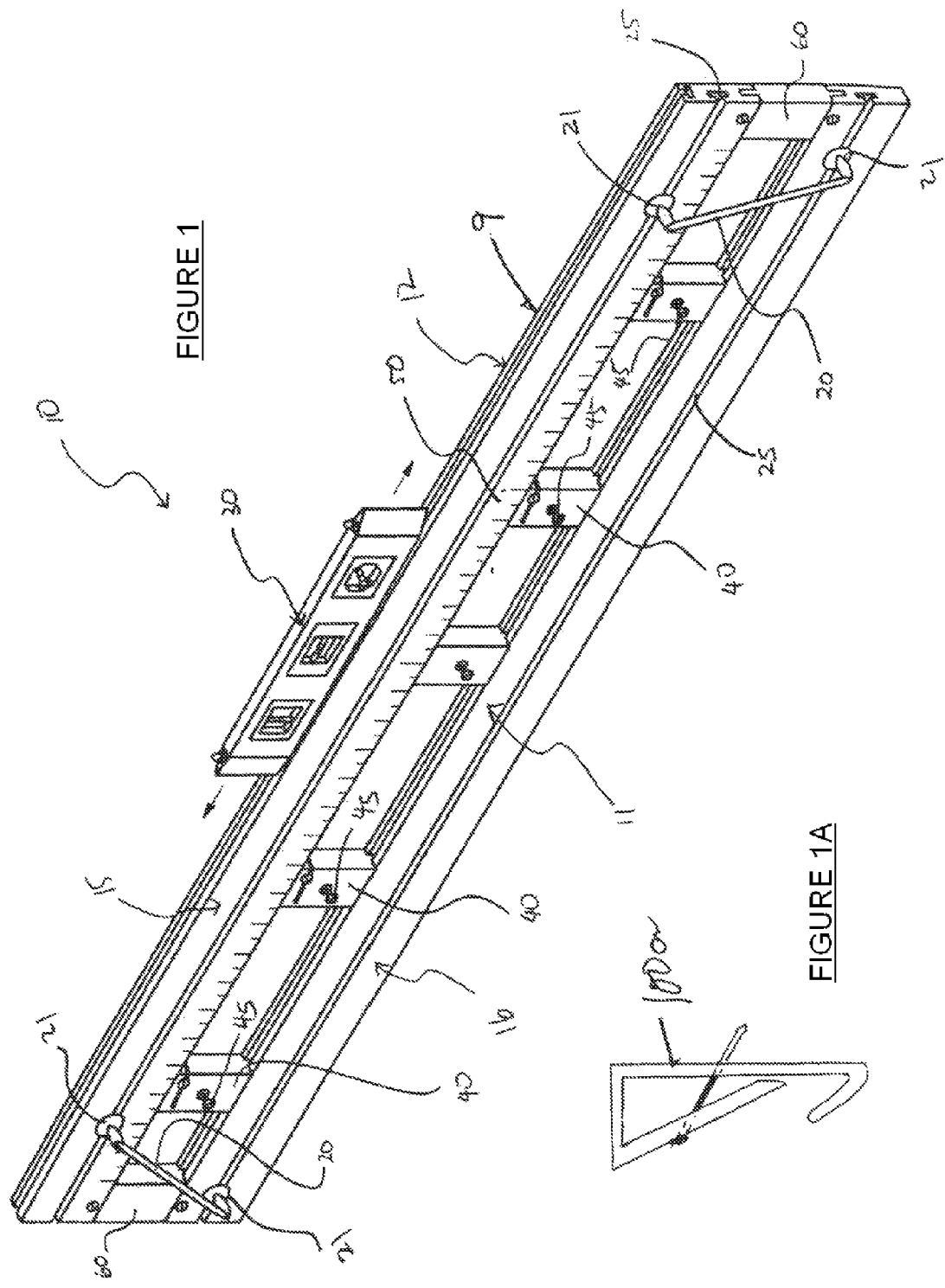
FIG. 1 is a perspective view of the front of a device as an embodiment of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
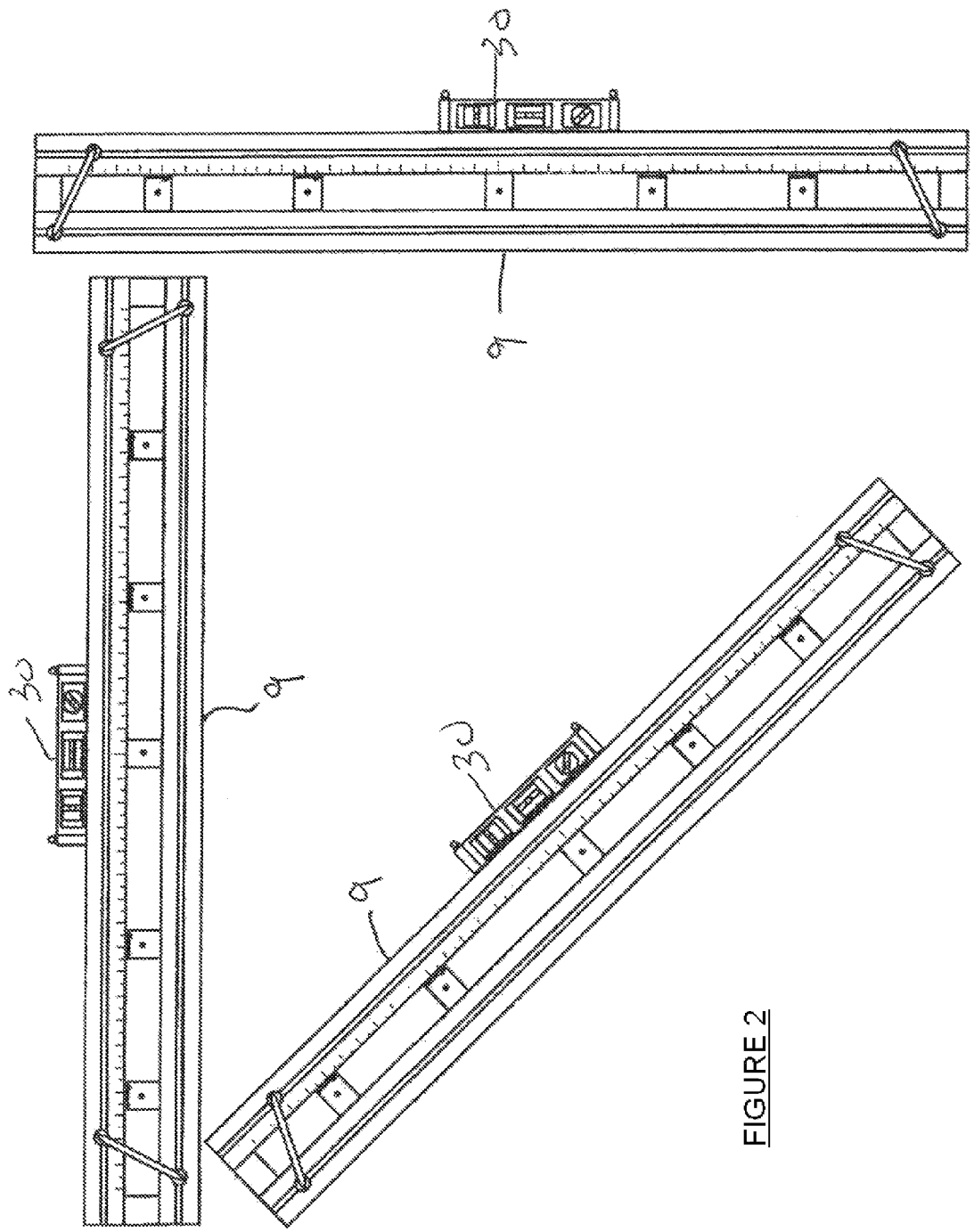
FIG. 2 illustrates common orientations in which the device can be used with the aid of the incorporated level. Other orientations can be achieved without the aid of the level.

FIG. 1 illustrates one embodiment of the hanging device. The hanging device or jig 10 comprises a frame 9, movable handles 20, a plurality of locator blocks 40 with locator pins 45, and a level 30. The frame 9 includes an upper portion 15 that incorporates a rule 50, a lower portion 16, and two end blocks 60. FIG. 2 illustrates that the jig can be used to hang items in various orientations. Other angles can also be achieved.

The handles 20 are moveable along the length of the frame 9 to allow the user to position the handle to suit the user's needs. The ends 21 of the handles are disposed within T-shaped slots 25 along the front side 11 of the frame 9 to allow the handles to slide within the slots so that the user may position the handle around the wall supported items (FIGS. 1, 5A-5B, 7-9).

Figure 3:
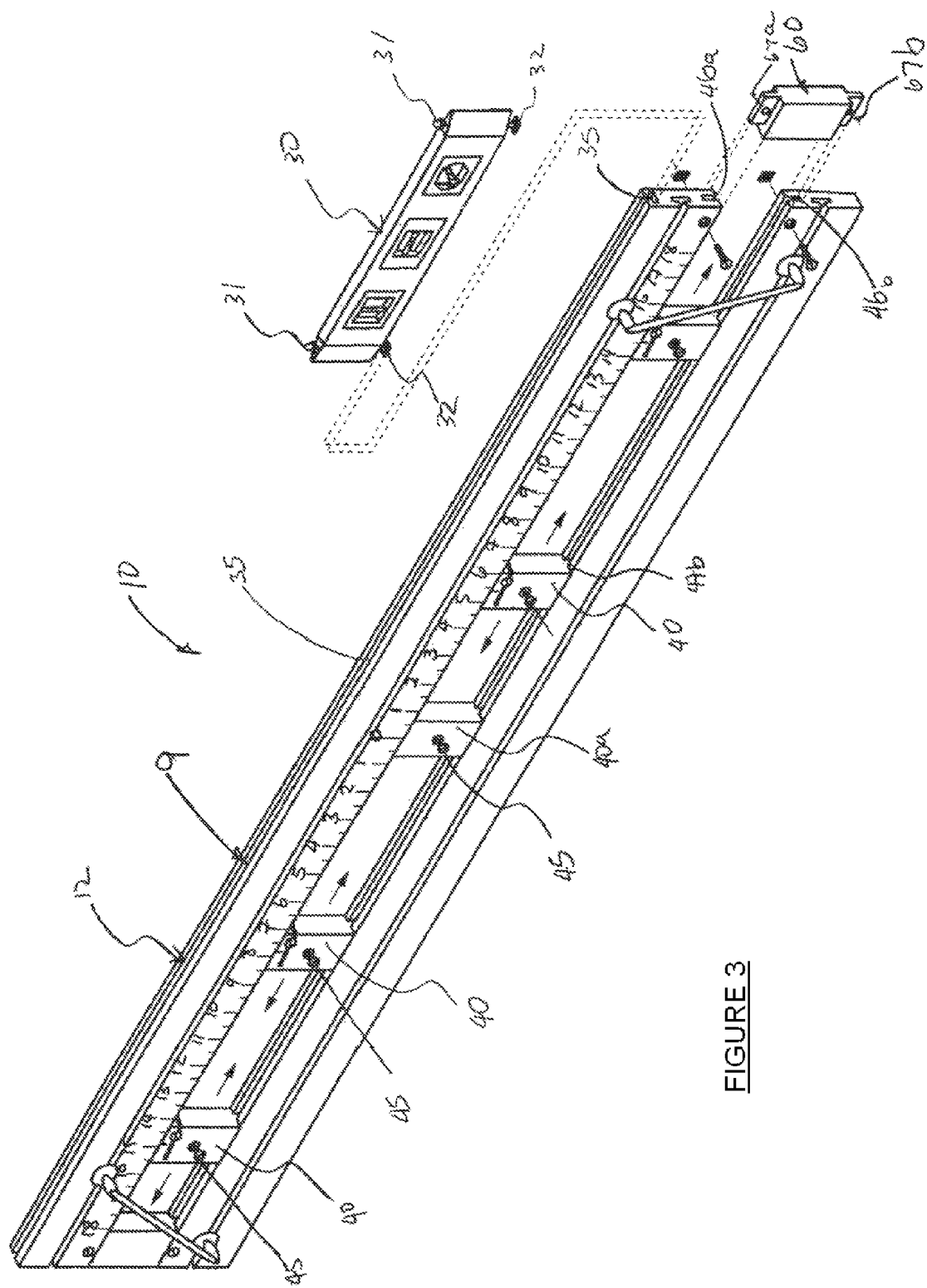
FIGS. 3 to 4B illustrate some of the movable parts of the device.

The level 30 is disposed on the top side 12 of the frame 9. The level 30 comprises two tightening fasteners 31 with feet 32 shaped and sized to fit within the T-shaped slot 35 along the top side 12 of the frame 9. The T shaped slot extends for the entire length of the frame 9. The level 30 slides along the T-shaped slot 35 to allow the user to adjust the position of the level 30 for user visibility depending on the orientation of the items being hung up, as illustrated in FIGS. 6 to 9. The level 30 is secured into place by fastening the tightening fasteners 31 such that the level 30 presses against the top side 12 of the frame 9 to prevent the level 30 from further sliding along the T-shaped slot 35 (FIG. 3).

Figure 4C:
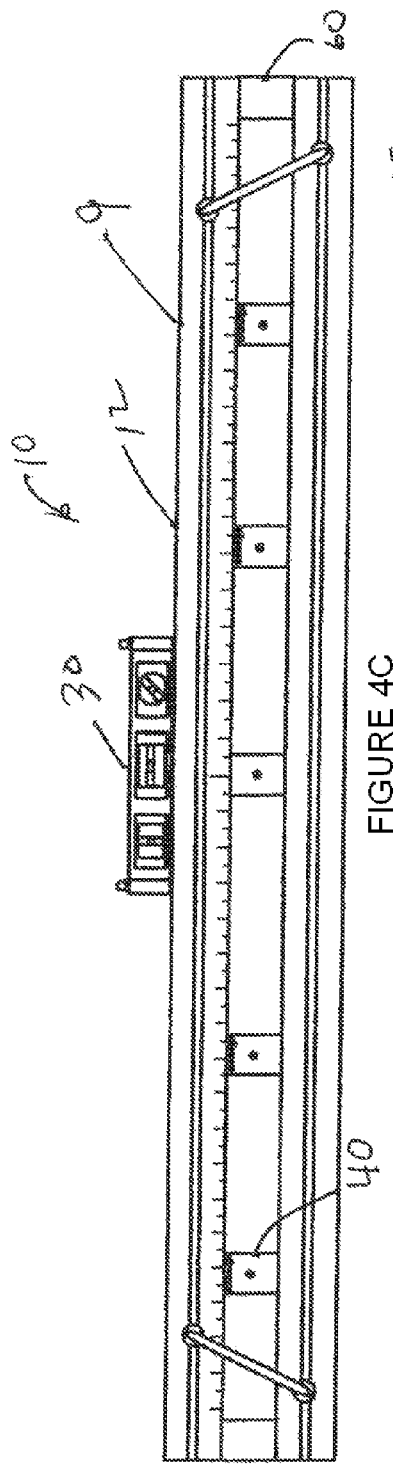
FIG. 4C is a front view of the device.
Figure 4B:
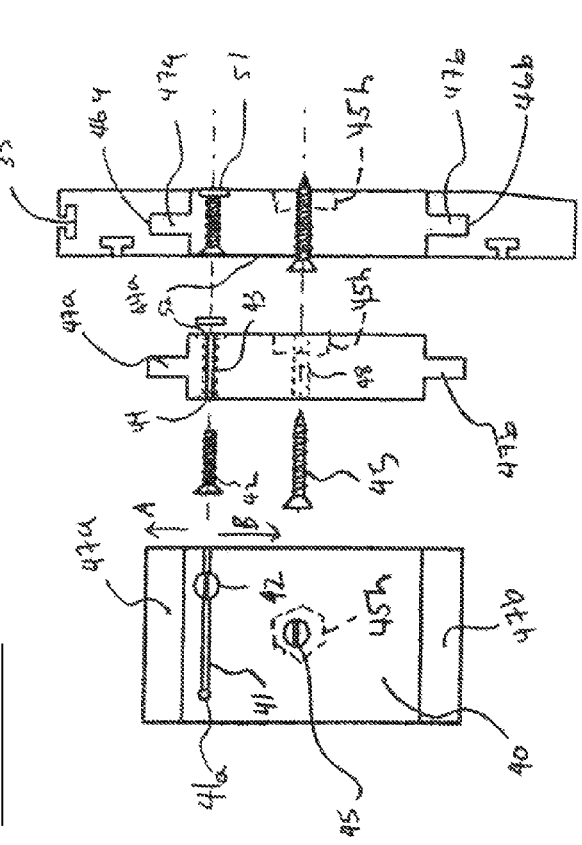

A plurality of locator blocks 40 are disposed between upper straight slot 46a and lower straight slot 46b, both of which run along the entire length of the frame 9. FIG. 4B illustrates that the locator block 40 has an upper lip 47a and a lower lip 47b which are fitted into the upper straight slot 46a, and lower straight slot 46b respectively, to allow the locator blocks to slideably move along the upper and lower straight slots 46a, 46b. The locator block 40 further comprises a locator pin 45 and locking nut 45h disposed substantially in the center of the locator block 40. The wall support item, such as a picture frame 100 (FIGS. 5A to 9), or a mirror, is hung from the locator pin or screw 45. The locator blocks 40 are adjustable along each side of the frame 9, due to the sliding of the locator block 40 along the upper and lower straight slots 46a, 46b respectively. A central locator block 40a is located in the middle of the frame 9, and preferably is stationary and not adjustable.

Adjustment of the locator block 40 allows the attached wall supported item, for example a picture frame, to be staged in the desired position and allows the user to preview the final arrangement of the picture frame(s) prior to marking the hanging surface. As illustrated in FIG. 4B, the locator pin 45 passes through the locator block 40 through a bore 48, and extends from the backside of the locator block 40. The locator pin 45, in its extended position, is able to make a mark on the hanging surface when the locator pin 45 is pressed against the hanging surface (FIGS. 5A-5B). For locator blocks 40 that are not being used to mark the hanging surface, the locator pins 45 can be retracted such that they retreat and do not extend into the backside of the locator block 40 to prevent unwanted marks on the hanging surface when the locator block 40 is pressed against the hanging surface to mark the hanging surface. They can also be removed completely if they interfere with hanging a larger picture, etc.

Locator blocks 40 are secured in the desired position by the use of a flexslot 41 and machine screw 42 as illustrated in FIG. 4B. The flexslot 41 is a horizontal slot near a top edge of the locator block 40. The flexslot 41 comprises a plain bore 43 (shown in hidden lines) to receive the screw 42, straddling the flexslot. A nut 51 is fit within a square recess portion in the back of the bore 43 (shown in hidden lines) to threadingly receive the screw. The square recess prevents the nut from turning as the machine screw is turned.

The bore 43 has a recessed portion 44 also straddling the flexslot. As the screw 42 is increasingly driven into the flexslot 41, the tapered underside of the head of the screw presses into the recessed portion 44 and the bore 43 and by wedge action opens the flexslot and forces the portion of the locator block 40 above the flexslot 41 to move in a direction "A" as indicated by an arrow, and the portion of the locator block below the flexslot 41 to move in a direction "B" to secure the locator block 40 in place by pressing the upper and lower lip 47a, 47b respectively, into the upper and lower straight slots 46a, 46b. The portion of the locator block 40 above the flexslot 41 moves in a direction "A" and the portion of the locator block below the flexslot 41 moves in a direction "B" about the hinge end 41a of the flexslot 41.

The bore 43 has a recessed portion 44 such that the head of the screw 42 is substantially flush against, or recessed below, the surface 44a of the locator block 40 when the screw 42 is in its fully embedded position as illustrated in FIG. 4B.

The flexslot 41 allows the locater blocks 40 to be secured in the desired position by the user so the user can use the locator pin 45 in the locator block 40 to mark the hanging surface. Once a user adjusts the locator blocks 40 and secures the locator blocks in place, the user is ready to mark the hanging surface 120. The bottom portion 16 of the frame 9 has an angled surface 17, which is used to form a pivot edge 18. With the item to be hung 100, such as a picture, hanging on the locator pin 45, the user rests the frame 9 against the hanging surface 120 on the angled surface 17, ensures by using the level that frame 9 is level, and pivots the frame 9 towards the hanging surface 120, as indicated by the arrow in a direction marked "C" such that the locator pins 45 are pressed against the hanging surface 120 to leave marks on the hanging surface 120. The marks are then used by the user to identify where the screw or pin for the attachment mechanism for the item being hung 100, should be located to get the desired effect simulated by the jig.

FIG. 6A shows that a picture 100 can be hung from the locator pin 45 on the block 40 using a picture wire 101a that is attached to the picture frame at attachments 101b, 101c.

Where more complex hangers, such as hangers 100a where the location from where the picture frame is hung is different from the location of the screw used to affix the hanger to the hanging surface (FIG. 1A) is used as an attachment mechanism, the complex hanger can be mounted onto the locator block using the locator pin 45 such that the use of the actual attachment mechanism is simulated.

Figure 4A:
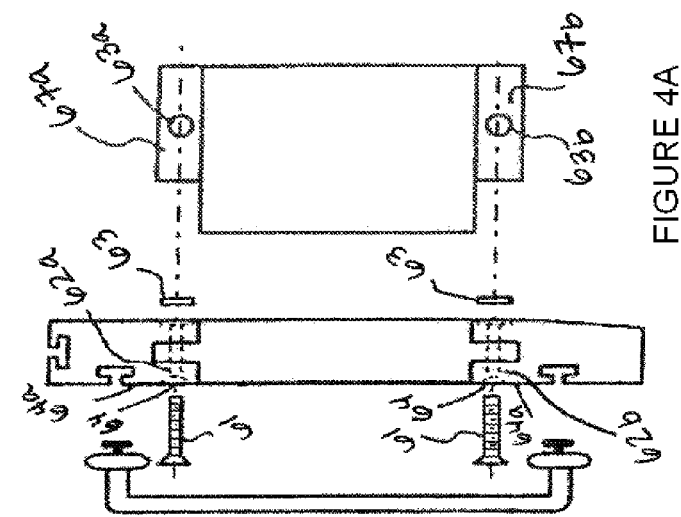
Figure 6:
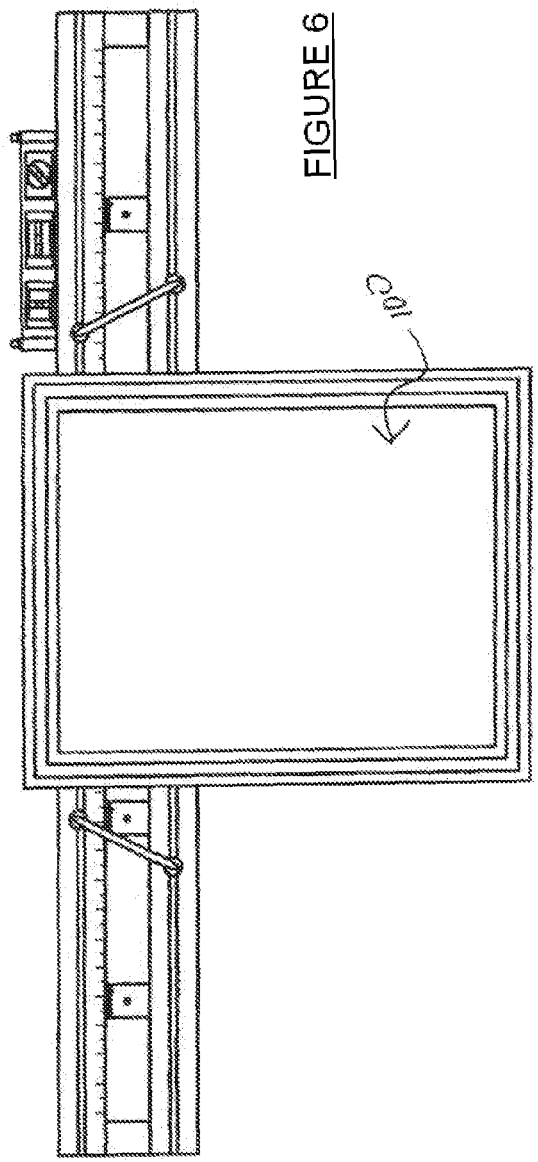
Figure 7:
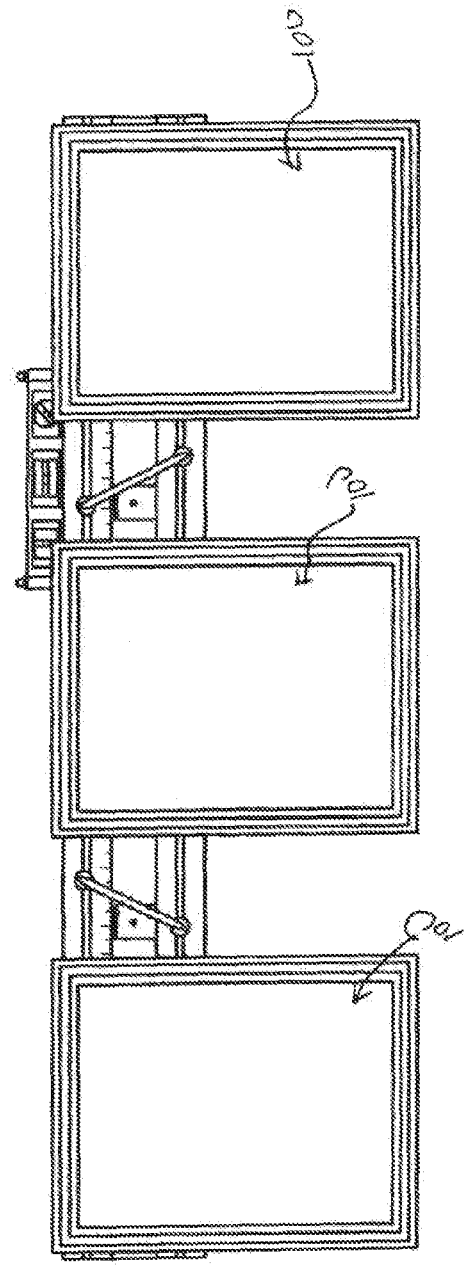

End blocks 60 are located on each end of the frame 9. The end blocks 60 are removable. Like the locator blocks 40, the end blocks 60 has an upper lip 67a and lower lip 67b which fit into upper straight slot 46a, and lower straight slot 46b respectively. The end blocks 60 are secured in position on either end of the jig 10 through the use of a fastening mechanism, such as machine screws 61. The screws 61 are fitted though plain bores 62a, 62b in the upper and lower straight slots which are aligned with bores 63*a*, 63*b* in the upper lip 67*a* and lower lip 67*b*. The bore 62*a*, 62*b* has a recessed portion 64 such that the head of the screw 61 is flush against the surface 64*a* when the screw 61 is in its fully embedded position as illustrated in FIG. 4A. Nuts 63 are arranged captured in square recesses and are used to engage the machine screws. The recesses prevent the nuts from turning as the machine screws are turned.

Figure 10:
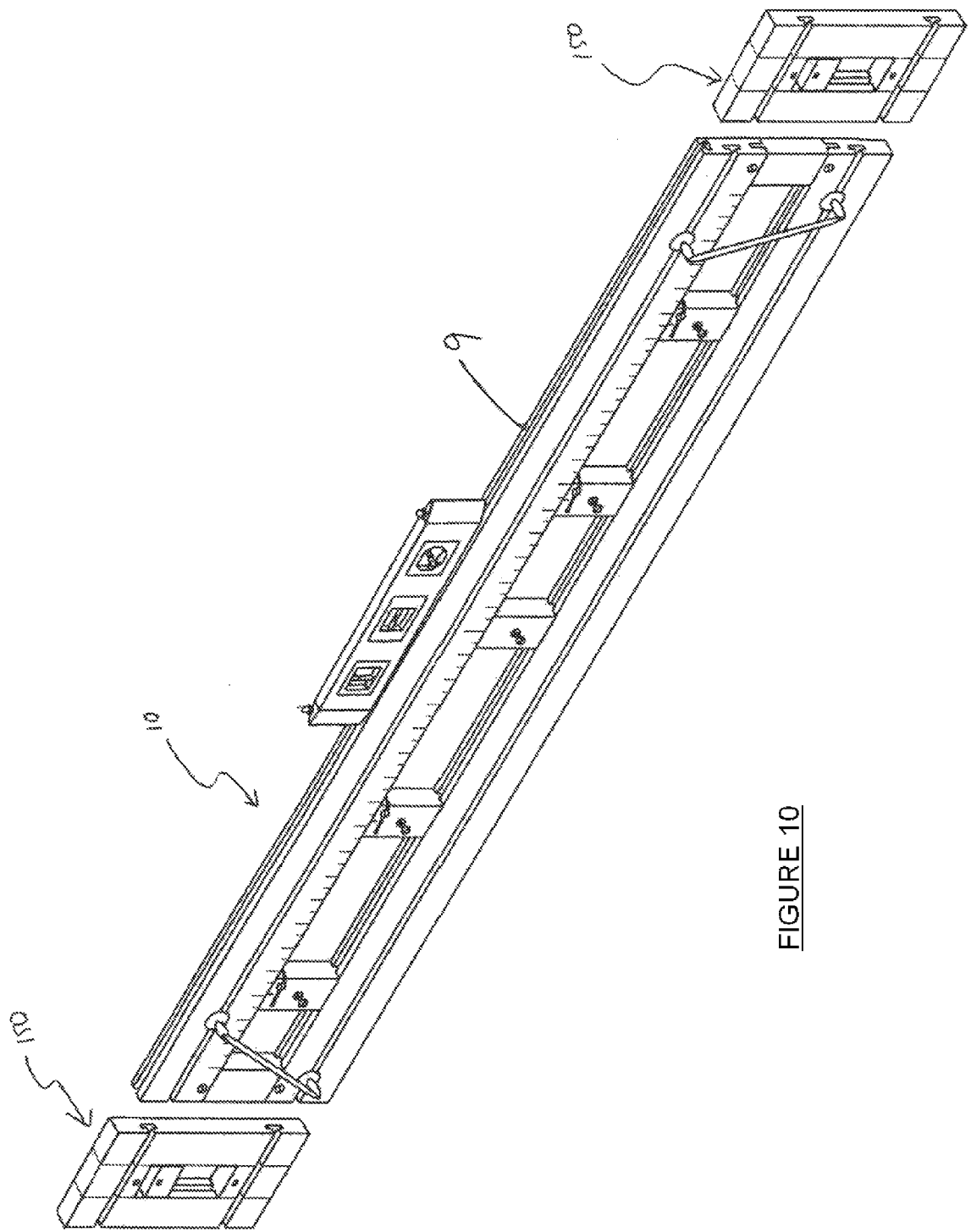
FIGS. 10 to 12 illustrate an alternate embodiment of the device for curtain rod attachments.
Figure 11:
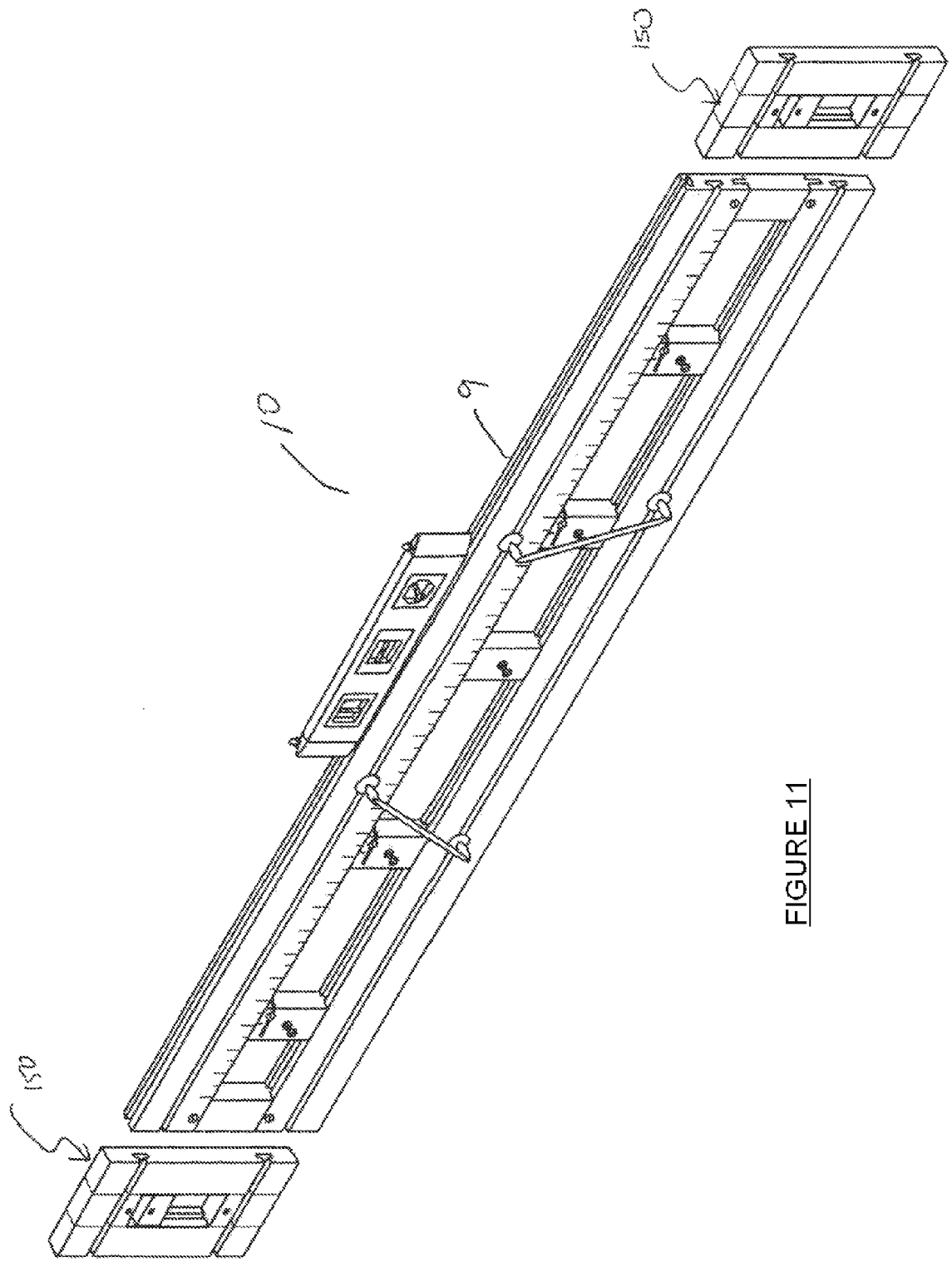
Figure 12:
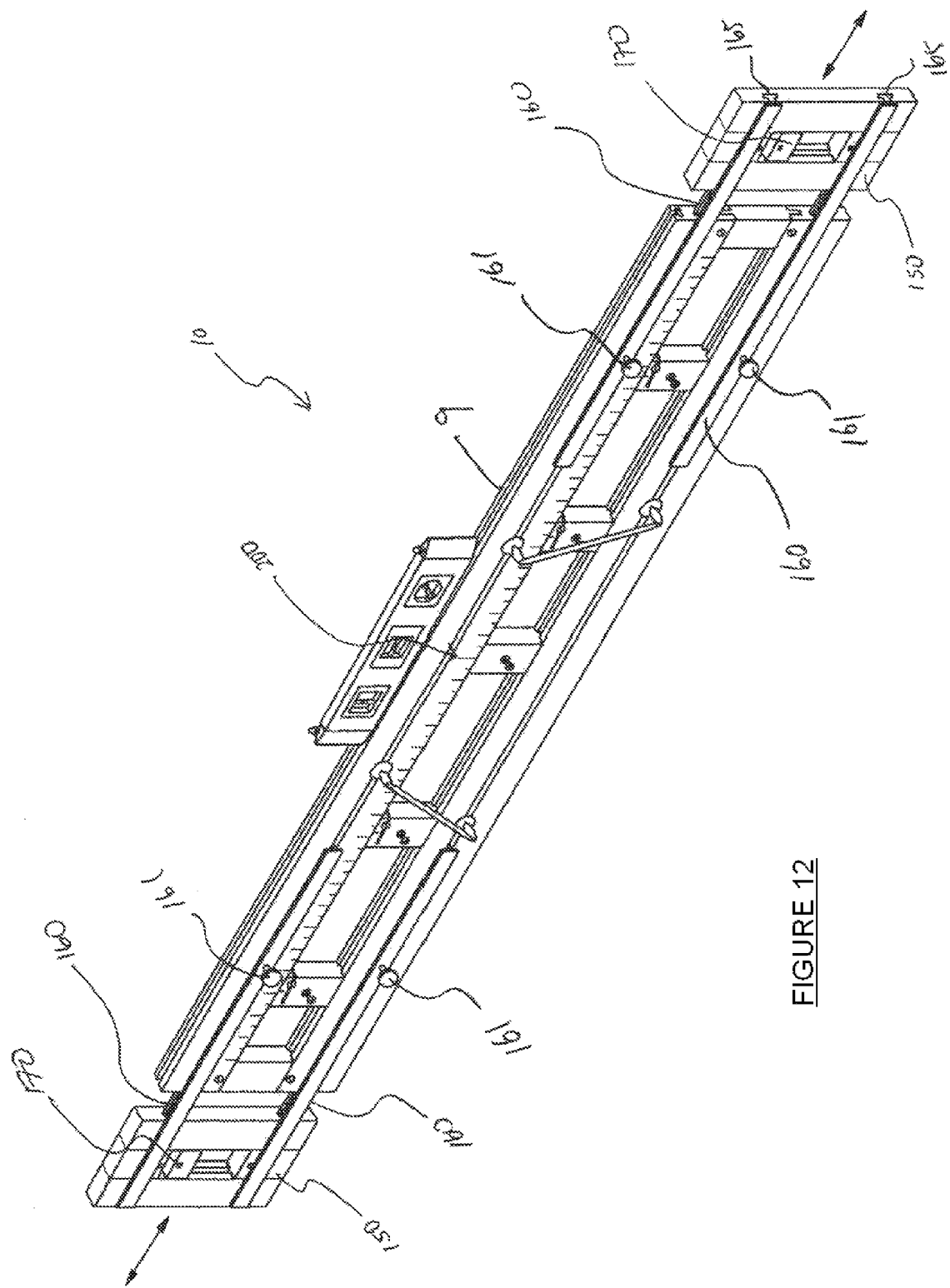
Figure 13:
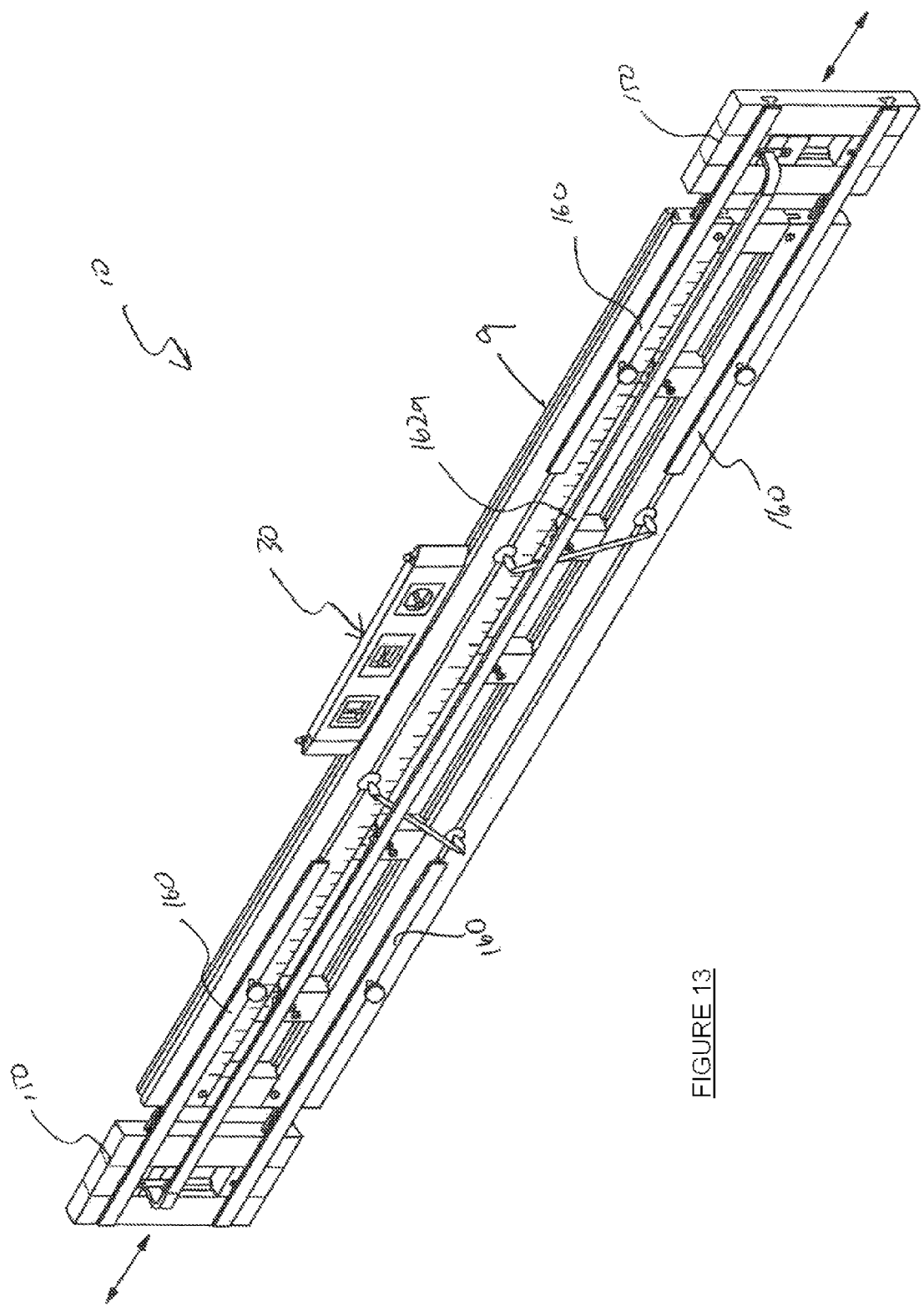

In another embodiment, the jig 10 can be used for the attachment of curtain rods through the use of a curtain rod end fixtures 150 (FIGS. 10-12). The curtain rod end fixture 150 is attached to the jig at both ends of the frame 9 beyond the end blocks 60. The curtain rod end fixtures 150 are attached to the frame 9 through the use of extension rods 160. In one embodiment, the extension rods 160 are H-shaped railings that fit through T-shaped slots 25 on the jig 10, as well as T-shaped slots 165 on the curtain rod end fixtures 150. The extension rods 160, and accordingly the curtain rod end fixtures 150 attached to the extension rods 160, are adjustable such that the curtain rod end fixtures 150 can be moved closer or farther away from the center 200 of the frame 9 to accommodate the various lengths of curtain rods. Fasteners 161 are used to secure the extension rods 160 into position once the curtain rod end fixtures 150 are spaced apart at the desired distance. The fasteners 161 may be fitted though a bore (not shown) in the extension rod so that the fastener 161 such as a screw, may tighten to secure the extension rod 160 to the frame 9. FIG. 14A is a front view of the jig with the curtain rod end fixtures 150 attached to the frame 9 using extension rods 160. FIGS. 13 and 14B-14D illustrate the device in use with various types of curtain rods 162*a*, 162*b*, 162*c*, 162*d*.

The curtain rod end fixtures 150 comprise a slide block 170 (FIG. 17) which is used to position and hold the curtain rod hangers. Various types of curtain rod hangers are illustrated in FIGS. 15 and 16. The slide block 170 is vertically adjustable similar to the locator block, wherein lips 172 are engaged within straight slots 173 to allow adjustment of the slide block along the straight slots 173. The slide block 170 is vertically moveable within a slide block opening 174 in the curtain rod end fixture 160. The slide block 170 comprises a bore 171 for a fastening mechanism to be passed through. The curtain rod end fixtures 160 further comprise bores 175 near the top and bottom edges of the slide block opening 174 through which a fastening mechanism, such as a screw, can be passed through. To position the curtain rod hangers, the bore 171 on the slide block and one of the bores 175 on the curtain rod end fixture 160 are aligned with the openings for a fastening mechanism 176 (FIGS. 15-16) on the curtain rod hangers. Fastening mechanisms 176, such as screws, are passed through the aligned bores 175, 171, such that the fastening mechanism 176 extend sufficiently onto the opposite side of the frame 9 to allow a mark to be made on the hanging surface when the jig is pressed against the hanging surface as described above.

FIGS. 18 to 22 illustrate the various positions of the slide block 170 used to accommodate various sizes of curtain rod hangers. FIG. 21 illustrates that the slide block is moved upwards closer to the top of the opening to accommodate curtain rod hangers with fastening mechanisms 176 closer together, while FIG. 20 illustrates that the slide block 170 can be moved downward to accommodate curtain rod hangers with more space between its fastening mechanisms. FIG. 22 illustrates that for hangers with a larger distance between the fastening mechanisms 176, the slide block 170 can be moved to its upper most position in the opening 174, to allow the fastening mechanisms 176 on the curtain rod hanger to engage with the slide block bore 171 and the bottom bore 175. Fasteners are fitted through the bores as illustrated in FIGS. 23 and 24, for use to mark the wall in the same manner as illustrated in FIGS. 5A and 5B.

In one embodiment, the jig 10 has a rule on the front surface, as illustrated in FIG. 3. The rule is marked in increments of distance from the center 200 of the ruler to allow for placement of items relative to the center of the frame 9.

The jig may be made of plastic, wood, metal, or any suitable material, or a combination thereof. The flexslot 41 is preferably made of material suitable for withstanding repeated stress, and may be reinforced throughout or at the hinge end of the flexslot.

FIG. 25 illustrates an oblong picture or mirror 200 having left and right hangers 201, 202 that are located on the back of the picture 200. The hangers 201, 202 are hung on the locator pins 45 on two blocks 40 (see FIG. 25A). The hangers 201, 202 are mounted on the back of the picture 200 at different elevations due to a manufacturing deviation or flaw. Accordingly, the picture is held at a tilted axis T when compared with a vertical axis V. When the level indicates that the frame 9 is horizontal. As shown in FIG. 26, the frame 9 is tilted to position the picture true vertically, adjusted by eye, and the jig then tilted and pressed to mark the wall at the locator pin 45 locations. The picture 200 can then be removed from the jig and hung on hangers located at the marks.

Figure 27:
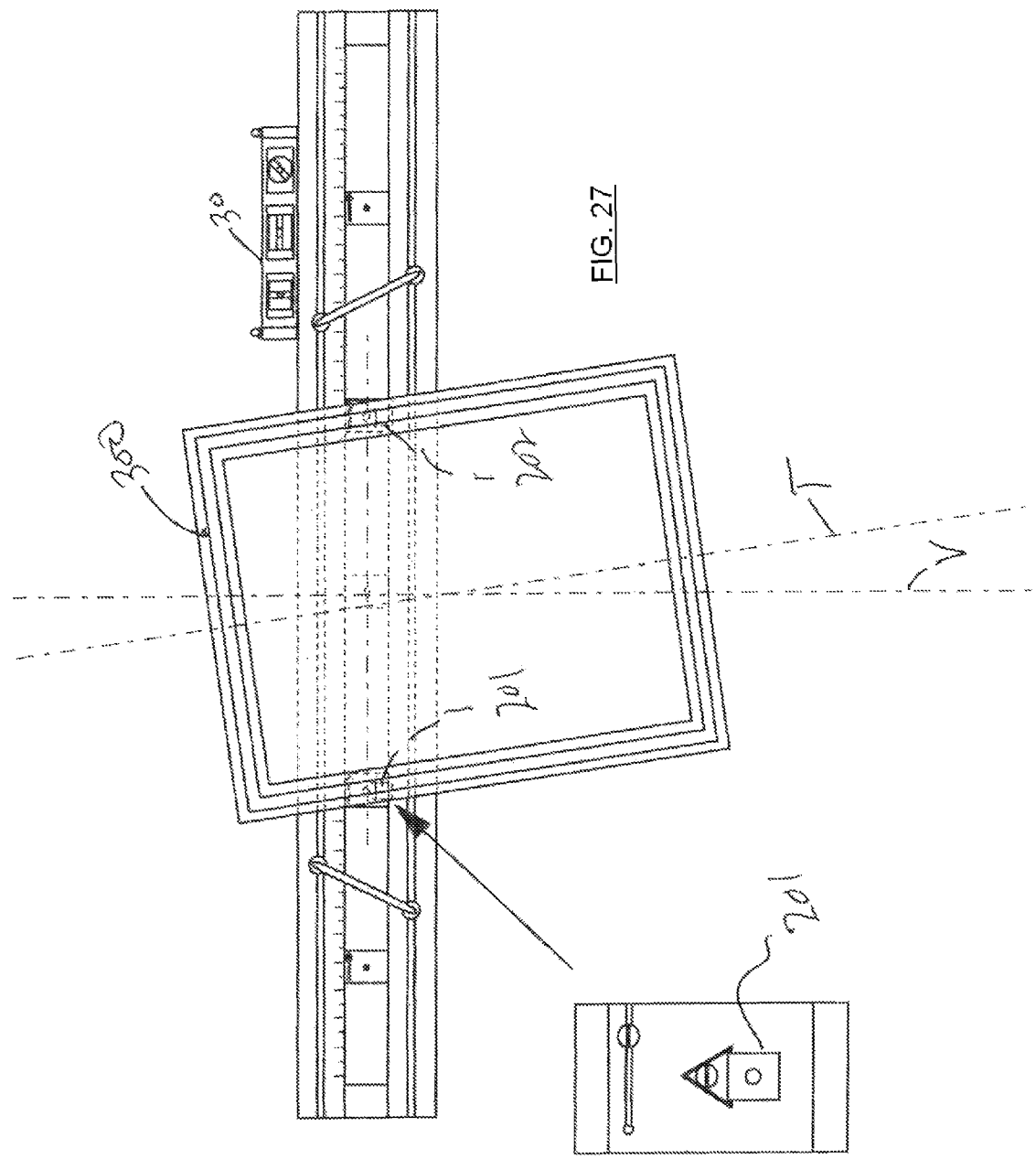
FIGS. 27 and 28 are first and second stage picture hanging views of hanging a rectangular picture similar to FIGS. 25 to 26.
Figure 28:
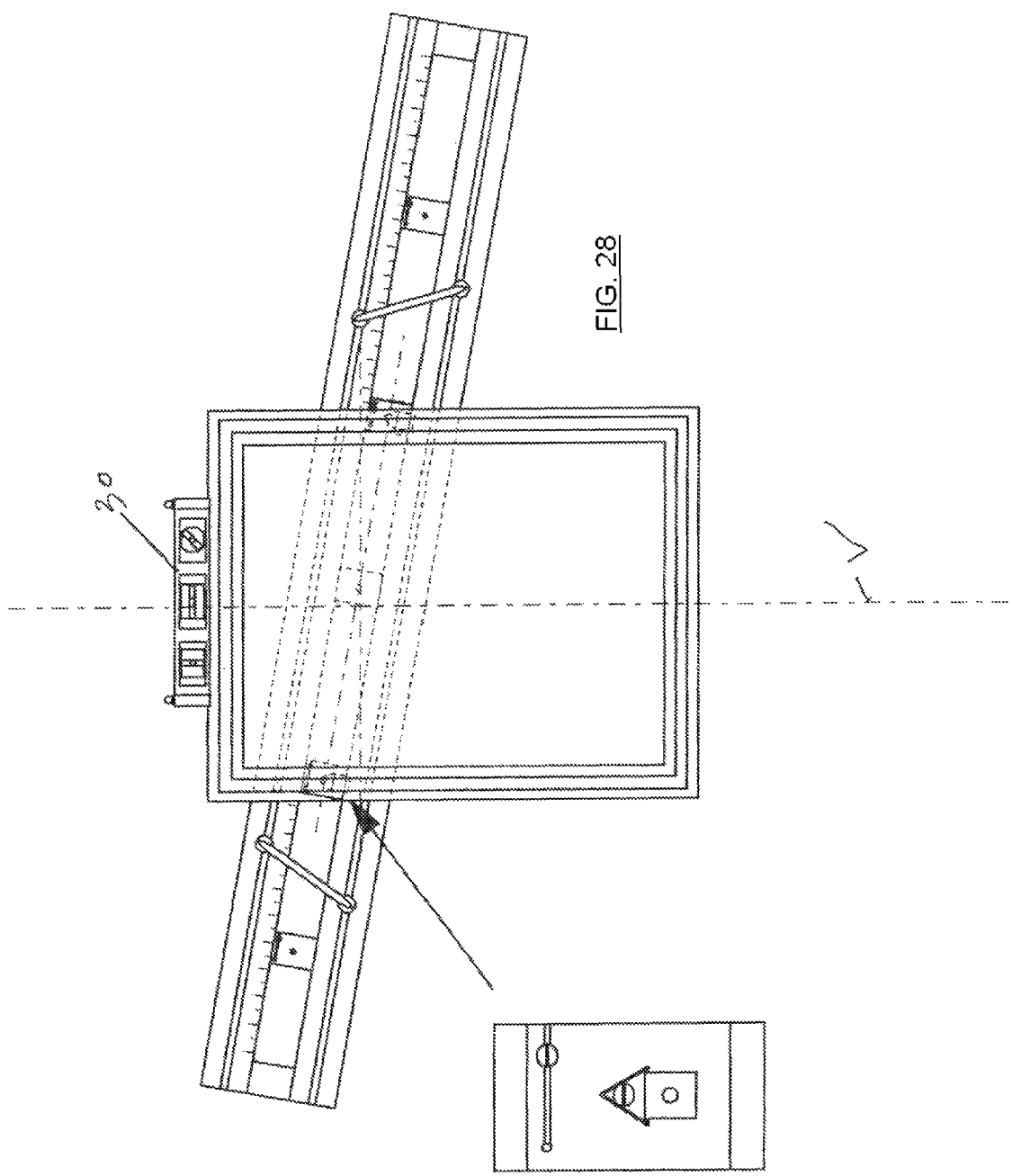

FIG. 27 illustrates a rectangular item 300 having hangers 201, 202 as previously described, attached onto the back of the item 300 at misaligned elevations. Differing from the previously described embodiment, because the item has a flat top, the level can be relocated, as shown in FIG. 28 to allow the user to more precisely tilt the frame 9 to align the item vertically before pressing the frame 9 to mark the wall at the locator pins 45.

FIG. 29 illustrates another embodiment of the invention adapted to properly and precisely align the mark of the locator phi 45 when a J-shaped hanger 402 or the like (FIG. 33) is used. These hangers are typically available in three sizes, small medium and large. An adapter 406 is used which has three slots S, M, and L corresponding to small, medium and large J-shaped hangers. The item 100 which is hung by a wire 410 is hung on the adapter 406 which hangs on the locator pin 45 on the block 40. The adapter 406 is hung on the pin 45 using the slot S, M or L depending on the size of the J-shaped hanger to be used by the user to hang the item on the wall. For a small J-shaped hanger the lowest slot S is used. For a medium size J-shaped hanger, the M slot is used (as shown). For a large J-shaped hanger, the L slot would be used. The adapter 406 is sized and shaped such that the location marked by the locator pin 45 when the wall is marked, will be the proper height for the associated nail or other fastener used with the J-shaped hanger 402 (FIG. 33), such that the item 100 will hang at the same elevation on the wall using the J-shaped hanger 402 as the elevation that it hung from the frame 9 on the adapter 406.

FIG. 34 illustrates an alternate embodiment device 512. This device 512 is substantially identical to the jig 10 shown in FIG. 1 except that it can incorporate a stud finder system 520. The stud finder system can include a stud finder 522 that can be similar to commercially available stud finders. The stud finder can be wireless and include a CPU 524 and a multiplicity of sensors 526. The CPU can be directly mounted on the device or remotely as required by the user. The sensors 526 can be incorporated within each block 40.

FIG. 34A illustrates the screw 45 recessed from a back of the block 40 by being unscrewed from the lock nut 45*h*. This would be appropriate for the process of stud finding wherein the device 512 would be laterally slid along the wall, to prevent the screw 45 from scratching the wall.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An alignment device for hanging an item on a wall, comprising:
    a frame;
    a level carried by said frame;
    locator blocks slideably mounted on the frame, slideable along at least part of the length of the frame, each locator block carrying a locator pin protruding from a first side of the block from which an item is hung, the locator pin extends toward the wall from a second side of the block opposite the first side, the locater pin fixed to the block such that when the frame is pressed toward the wall with the item hung thereon, the pin makes a mark on the wall to indicate where an attachment mechanism for the item is to be located.

2. The device according to claim 1, further comprising a rule displayed on the frame to precisely locate the sliding position of the blocks on the frame.

3. The device according to claim 1, further comprising a stud finder slidably mounted on the frame and operatively moved along the wall to locate studs below the wall surface.

4. The device according to claim 3, wherein the stud finder is carried on one of the locator blocks.

5. The device according to claim 1, wherein the pin comprises a marker.

6. The device according to claim 1, wherein the pin comprises a locking adjustable screw with a piercing point.

7. The device according to claim 1 wherein the frame and the level are interconnected by a dovetail slot arrangement that permits relative sliding therebetween but retains the level on the frame.

8. The device according to claim 1, further comprising a pair of curtain rod end fixtures attached to the frame via extension rods, the extension rods, and accordingly the curtain rod end fixtures attached to the extension rods, are adjustable such that the curtain rod end fixtures can be moved closer or farther away from a center of the frame to accommodate various lengths of curtain rods;
    the extension rods are securable into position on the frame once the curtain rod end fixtures are spaced apart at the desired distance; and
    the curtain rod end fixtures comprise locator bores that are adjustable to align with fastening bores of curtain rod hangers, and fastening mechanisms, the fastening mechanisms are passed through the locator bores, such that the fastening mechanisms extend sufficiently onto the opposite side of the curtain rod end fixtures to allow a mark to be made on the wall when the frame is pressed against the wall.

9. The device according to claim 8, wherein said curtain rod end fixtures comprise a slide block vertically adjustable to position the locator bores to be aligned with fastening bores of the curtain rod hangers.

10. An alignment device for hanging an item on a wall, comprising:
    a frame;
    a level carried by said frame;
    locator blocks slideably mounted on the frame, slideable along at least part of the length of the frame, each locator block comprising a locator pin protruding on a first side of the block from which an item is hung, the locator pin extends toward the wall from a second side of the block opposite the first side, the locater pin, when pressed against the wall, makes a mark on the wall to indicate where an attachment mechanism for the item is to be located;
    wherein the frame comprises parallel portions separated by a gap, and the locator blocks reside substantially within the gap and are engaged to the parallel portions such that the locator blocks can slide along the gap.

11. The device according to claim 10, wherein the locator blocks comprise a slot and a fastener that penetrates the slot, the fastener having a tapered fastener head and, depending on the degree of penetration of the tapered fastener head into the slot, opens the slot to increase the dimension of the locator block between the parallel portions to cause the locator block to be wedged between the parallel portions.

12. The device according to claim 10, wherein the locator blocks are engaged to the parallel portions by tongue and slot formations and the locator blocks comprise locking mechanisms that once engaged, wedge the locator blocks between the parallel portions.

13. A method of precisely locating an item to be hanged on a wall comprising the steps of:
    providing a frame having sliding locator blocks, each with a locator pin therethrough;
    hanging at least one item on the locator pins;
    slidingly moving the locator blocks along the frame until the desired positions are achieved;
    securing the locator blocks to the frame to prevent further movement from their desired positions;
    placing the frame against the wall with the at least one item hanging from the locator pins and pressing the frame to the wall, wherein the locator pins mark the wall at the exact desired points where permanent hangers will be driven into the wall to support the at least one item;
    moving the frame away from the wall and installing permanent hanging means at the marked locations on the wall.

14. The device according to claim 1, wherein the frame comprises parallel portions separated by a gap, and the locator blocks reside substantially within the gap such that the locator blocks can slide along the gap, and the locator blocks comprise locking mechanisms that once engaged, lock the locator blocks at desired location along the parallel portions.

15. An alignment device for positioning curtain rods hangers on a wall, comprising:
    a frame;
    a pair of curtain rod end fixtures attached to the frame via extension rods, the extension rods being adjustable such that the curtain rod end fixtures can be moved closer or farther away from a center of the frame to accommodate various lengths of curtain rods;
    the extension rods being securable into position on the frame once the curtain rod end fixtures are spaced apart at the desired distance; and
    the curtain rod end fixtures comprise locator bores that are adjustable to align with fastening bores of curtain rod hangers and marking mechanisms, the marking mechanisms passing through the locator bores such that the marking mechanisms extend sufficiently onto the opposite side of the curtain rod end fixtures to allow a mark to be made on the wall when the frame is pressed against the wall.

16. The device according to claim 15, further comprising a level carried by said frame.

17. The device according to claim 15, wherein the marking mechanisms comprises screws.

18. The device according to claim 15, wherein the frame and the level are interconnected by a dovetail slot arrangement that permits relative sliding therebetween but retains the level on the frame.

19. The device according to claim 15, wherein said curtain rod end fixtures comprise a slide block vertically adjustable to position the locator bores to be aligned with fastening bores of the curtain rod hangers.

\* \* \* \* \*